United States Patent [19]
Masuda et al.

[11] Patent Number: 5,398,078
[45] Date of Patent: Mar. 14, 1995

[54] METHOD OF DETECTING A MOTION VECTOR IN AN IMAGE CODING APPARATUS

[75] Inventors: Tadaaki Masuda, Tokyo; Yoshiharu Uetani, Kawasaki; Toshinori Odaka, Yokohama; Tadahiro Oku, Urayasu; Tomoo Yamakage, Kawasaki, all of Japan

[73] Assignee: Kabushiki Kaisha Toshiba, Kawasaki, Japan

[21] Appl. No.: 969,351

[22] Filed: Oct. 30, 1992

[30] Foreign Application Priority Data

Oct. 31, 1991 [JP] Japan ................... 3-286842
Aug. 27, 1992 [JP] Japan ................... 4-228260
Sep. 30, 1992 [JP] Japan ................... 4-283543
Sep. 30, 1992 [JP] Japan ................... 4-286739

[51] Int. Cl.$^6$ ............................ H04N 7/137
[52] U.S. Cl. ................... 348/699; 348/413; 348/416
[58] Field of Search ............. 358/105, 133, 136; H04N 7/137; 348/413, 416, 699

[56] References Cited

U.S. PATENT DOCUMENTS

| | | | |
|---|---|---|---|
| 4,901,145 | 2/1990 | Harradine et al. | 358/105 |
| 5,027,205 | 6/1991 | Avis et al. | 358/133 |
| 5,128,756 | 7/1992 | Johnston et al. | 358/105 |
| 5,208,667 | 5/1993 | Saunders | 358/136 |

FOREIGN PATENT DOCUMENTS 56-143776 11/1981 Japan .

Primary Examiner—Tommy P. Chin
Assistant Examiner—Richard Lee
Attorney, Agent, or Firm—Oblon, Spivak, McClelland, Maier & Neustadt

[57] ABSTRACT

A method of detecting a motion vector in an image coding apparatus, including blocking an input image block to be coded into a plurality of input blocks each consisting of a plurality of pixels; sub-sampling a coded image signal to obtain a coded and sub-sampled image signal; sub-sampling the input image block at a predetermined pixel interval to obtain a sub-sampled input block; searching a primary block most correlated with the sub-sampled input block from the coded and sub-sampled image signal in a predetermined range, to output a primary motion vector which indicates the primary block most correlated with the sub-sampled input blocks; and controlling at least one of a central position of a searching area and a searching pel accuracy in accordance with a type of the primary motion vector, to search a secondary block most correlated with one of the input blocks from a coded image signal, to obtain a secondary motion vector.

5 Claims, 24 Drawing Sheets

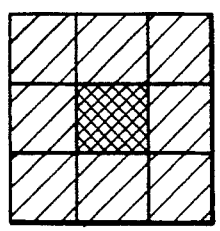
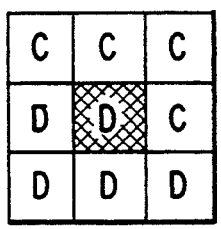
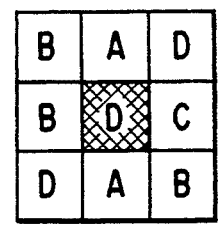
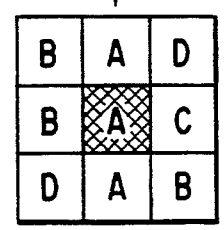
FIG. 2A   FIG. 2B   FIG. 2C
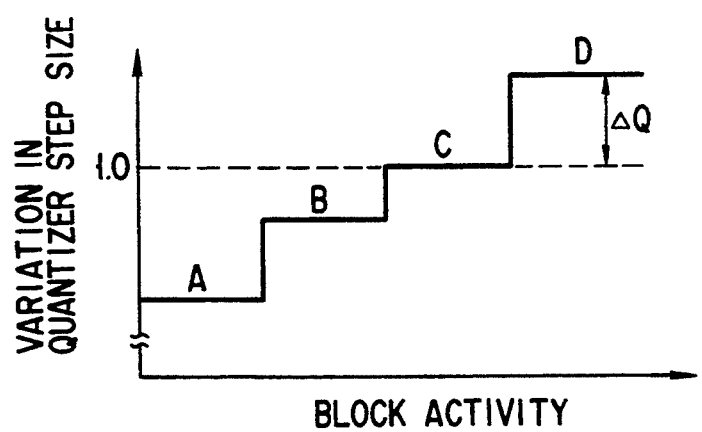
FIG. 3
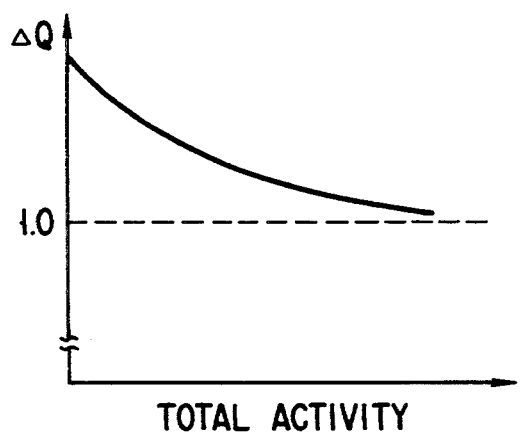
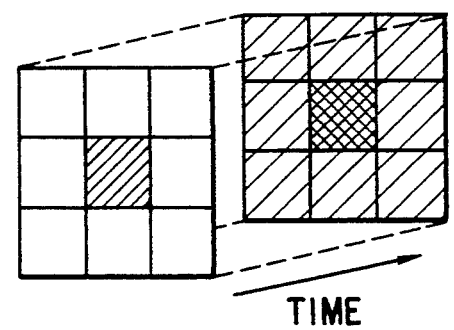
FIG. 4   FIG. 5

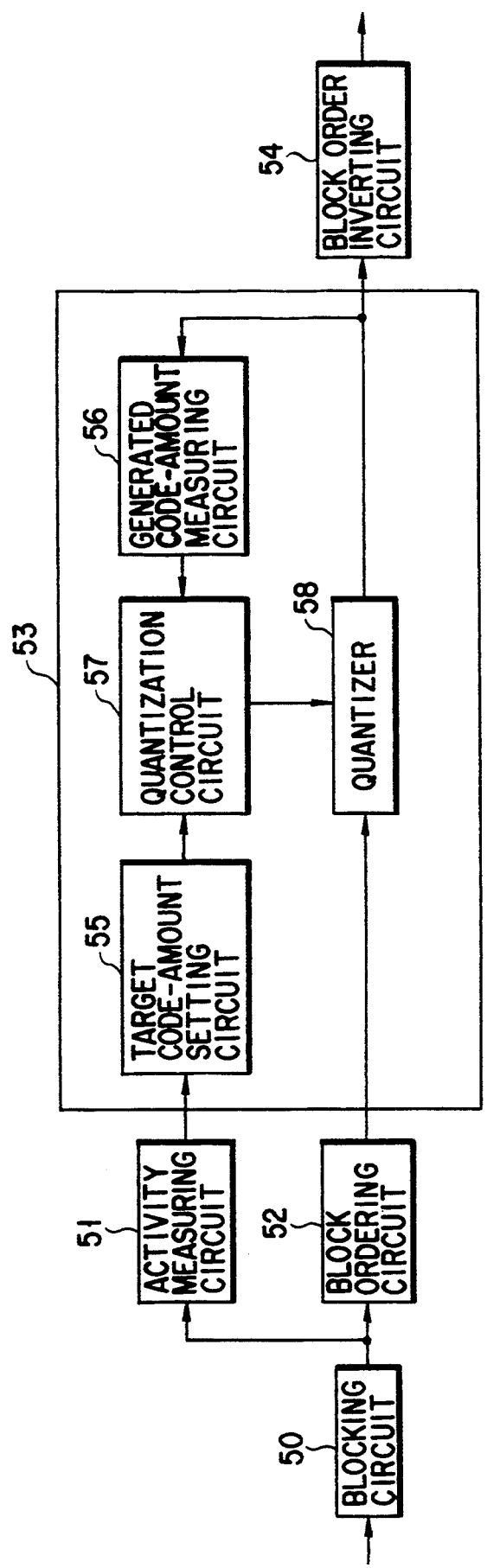
F I G. 8

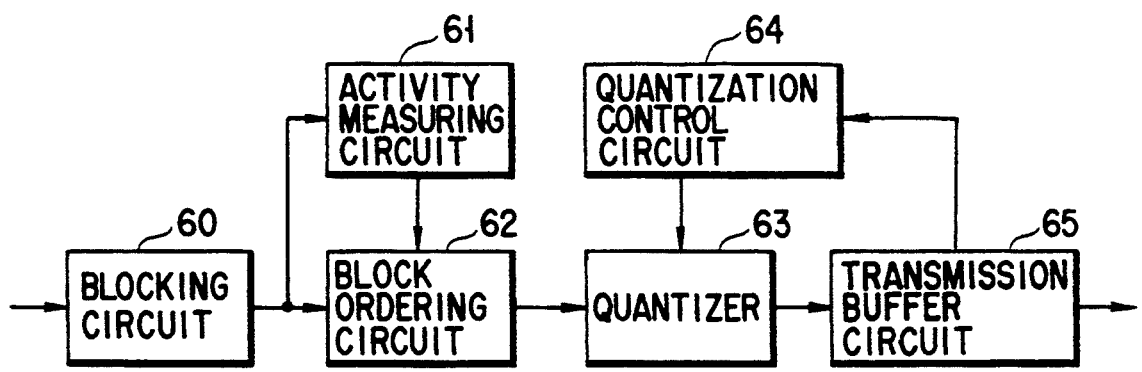
F I G. 12
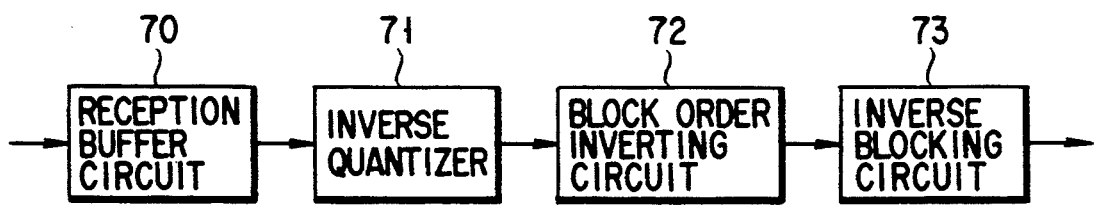
F I G. 13

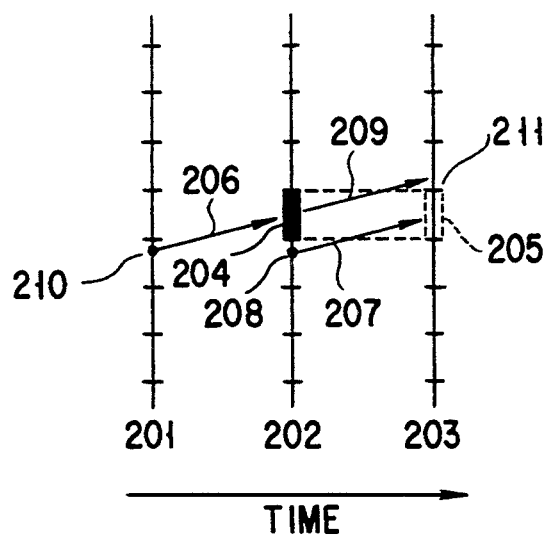
F I G. 19
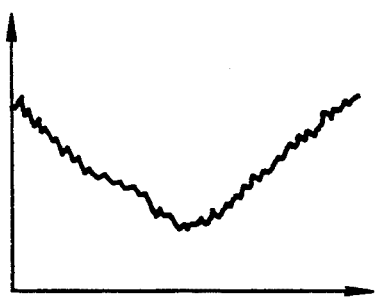
F I G. 20A
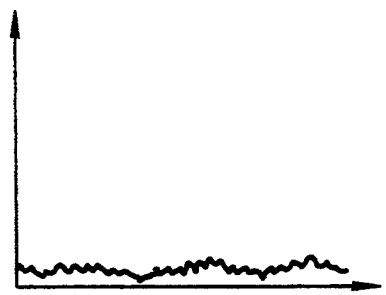
F I G. 20B
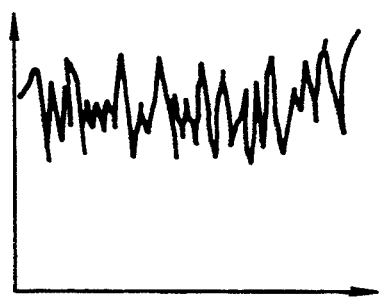
F I G. 20C
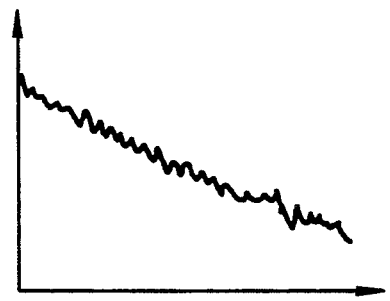
F I G. 20D

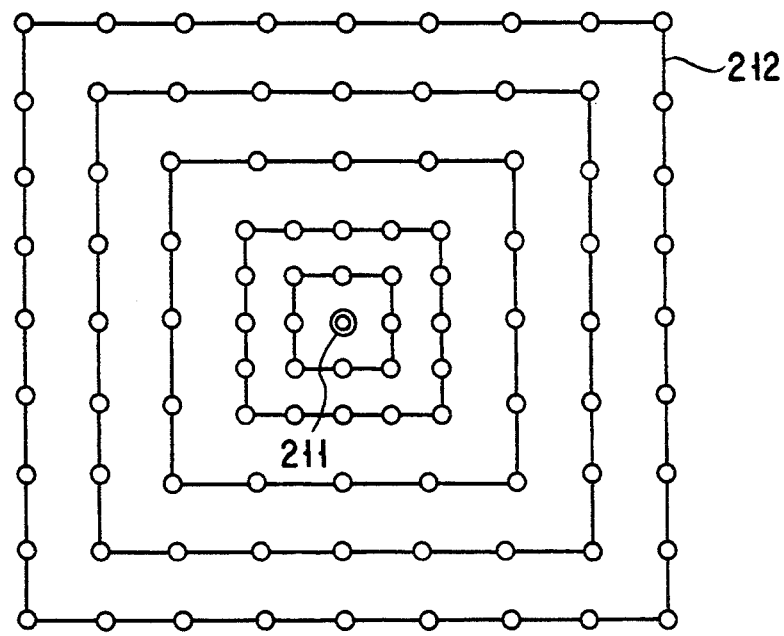
F I G. 21
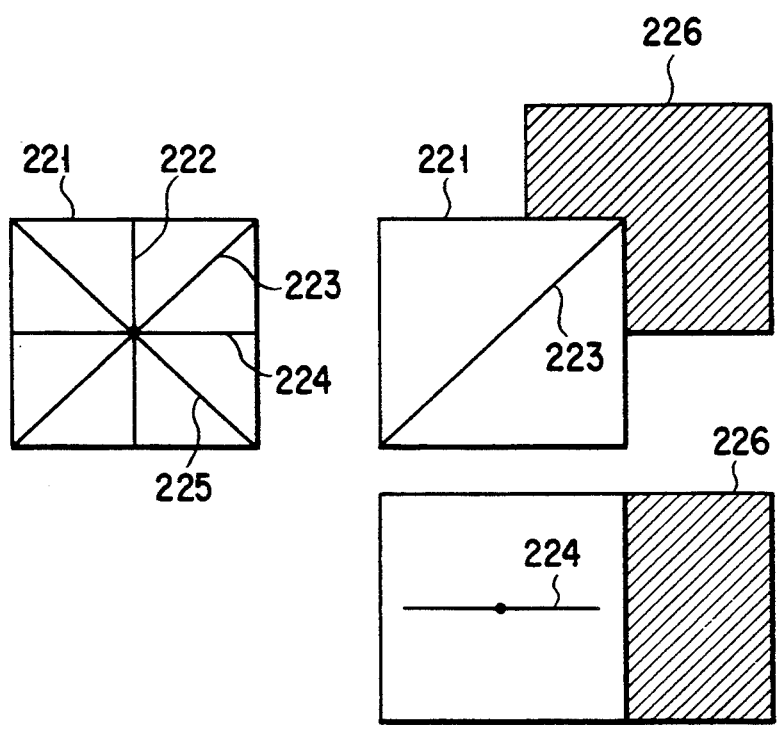
F I G. 22

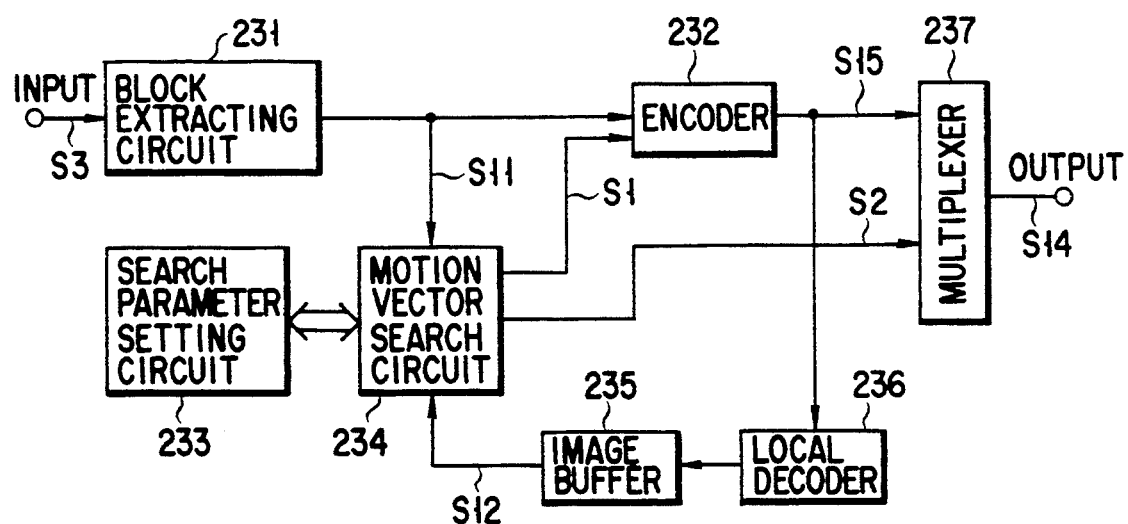
F I G. 23
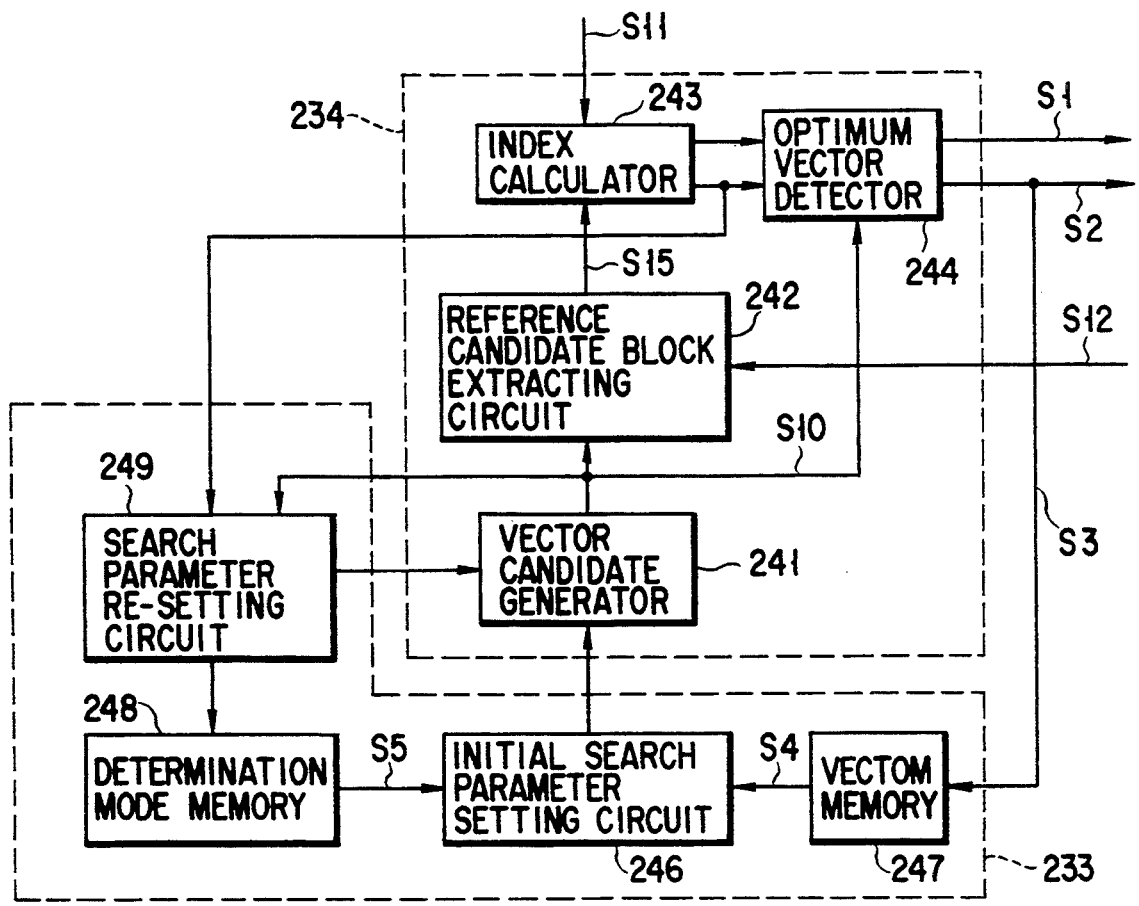
F I G. 24

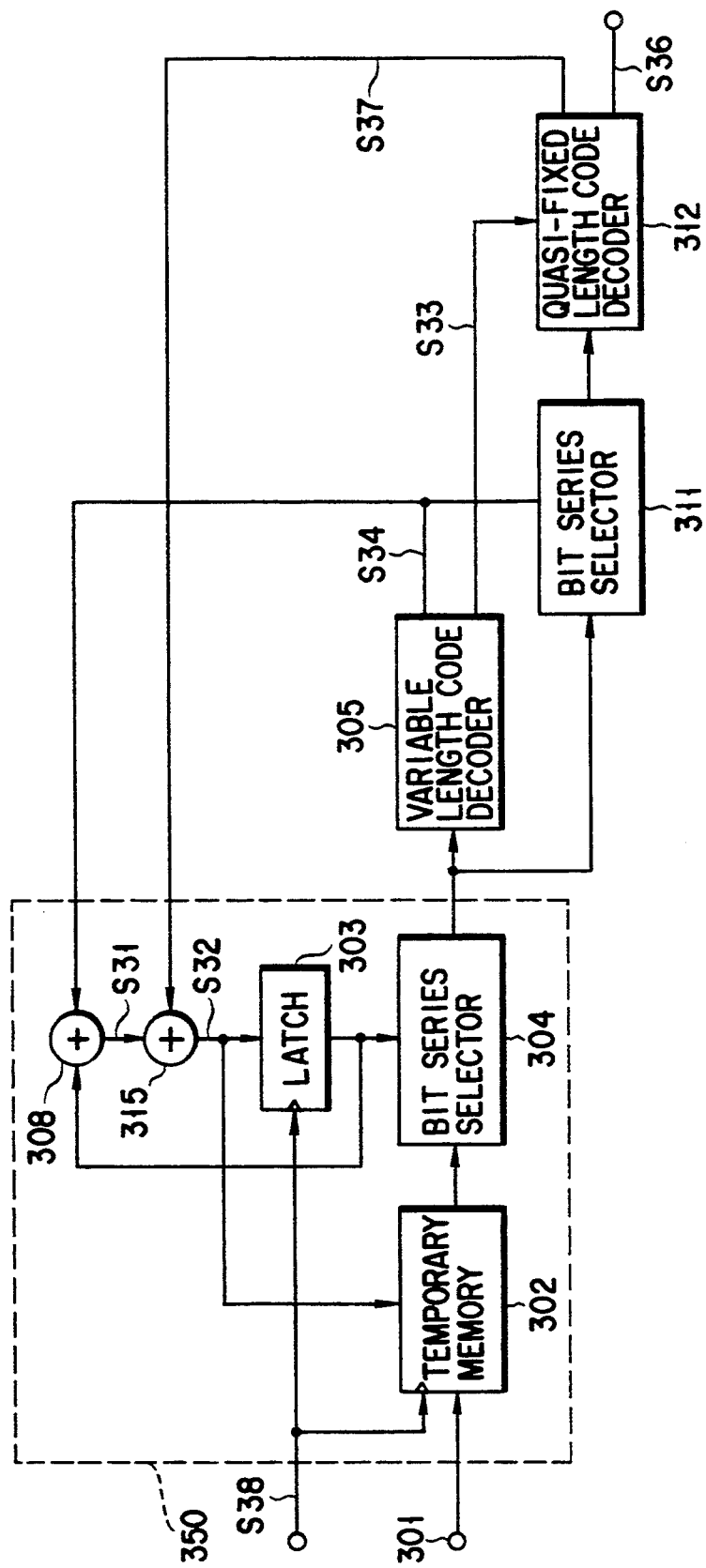
F I G. 25

| INFORMATION SYMBOL | VARIABLE LENGTH CODE | CODE LENGTH |
|:---:|:---:|:---:|
| a | 0 | 1 |
| b | 1 0 | 2 |
| c | 1 1 0 | 3 |
| d | 1 1 1 0 0 | 5 |
| e | 1 1 1 0 1 | 5 |
| f | 1 1 1 1 0 | 5 |
| g | 1 1 1 1 1 0 0 | 7 |
| h | 1 1 1 1 1 0 1 | 7 |
| i | 1 1 1 1 1 1 0 | 7 |
| j | 1 1 1 1 1 1 1 | 7 |

F I G. 26

INPUT "0110011 1010111 0011111 1111000 0101010...."

| ST | LATCH 303 | INPUT TO SELECTOR 304 | OUTPUT FROM SELECTOR 304 | S33 | S34 | S31 | OUTPUT FROM SELECTOR 311 | S36 | S37 | REMAINDER | QUOTIENT |
|---|---|---|---|---|---|---|---|---|---|---|---|
| 0 | 0 | 0110011 1010111 | 0110011 | a | 1 | 1 | 110011 | a | 0 | 1 | 0 |
| 1 | 1 | 0110011 1010111 | 1100111 | c | 3 | 4 | 0111 | c | 0 | 4 | 0 |
| 2 | 4 | 0110011 1010111 | 0111010 | a | 1 | 5 | 111010 | a | 0 | 5 | 0 |
| 3 | 5 | 0110011 1010111 | 1110101 | QUASI-FIXED LENGTH | 3 | 8 | 0101 | e | 2 | 3 | 1 |
| 4 | 3 | 1010111 0011111 | 0111001 | a | 1 | 4 | 111001 | a | 0 | 4 | 0 |
| 5 | 4 | 1010111 0011111 | 1110011 | QUASI-FIXED LENGTH | 3 | 7 | 0011 | d | 2 | 2 | 1 |
| 6 | 2 | 0011111 1111000 | 1111111 | QUASI-FIXED LENGTH | 3 | 5 | 1111 | j | 4 | 2 | 1 |
| 7 | 2 | 1111000 0101010 | 1100001 | c | 3 | 5 | 0001 | c | 0 | 5 | 0 |
| ... | ... | ... | ... | ... | ... | ... | ... | ... | ... | ... | ... |

F I G. 27

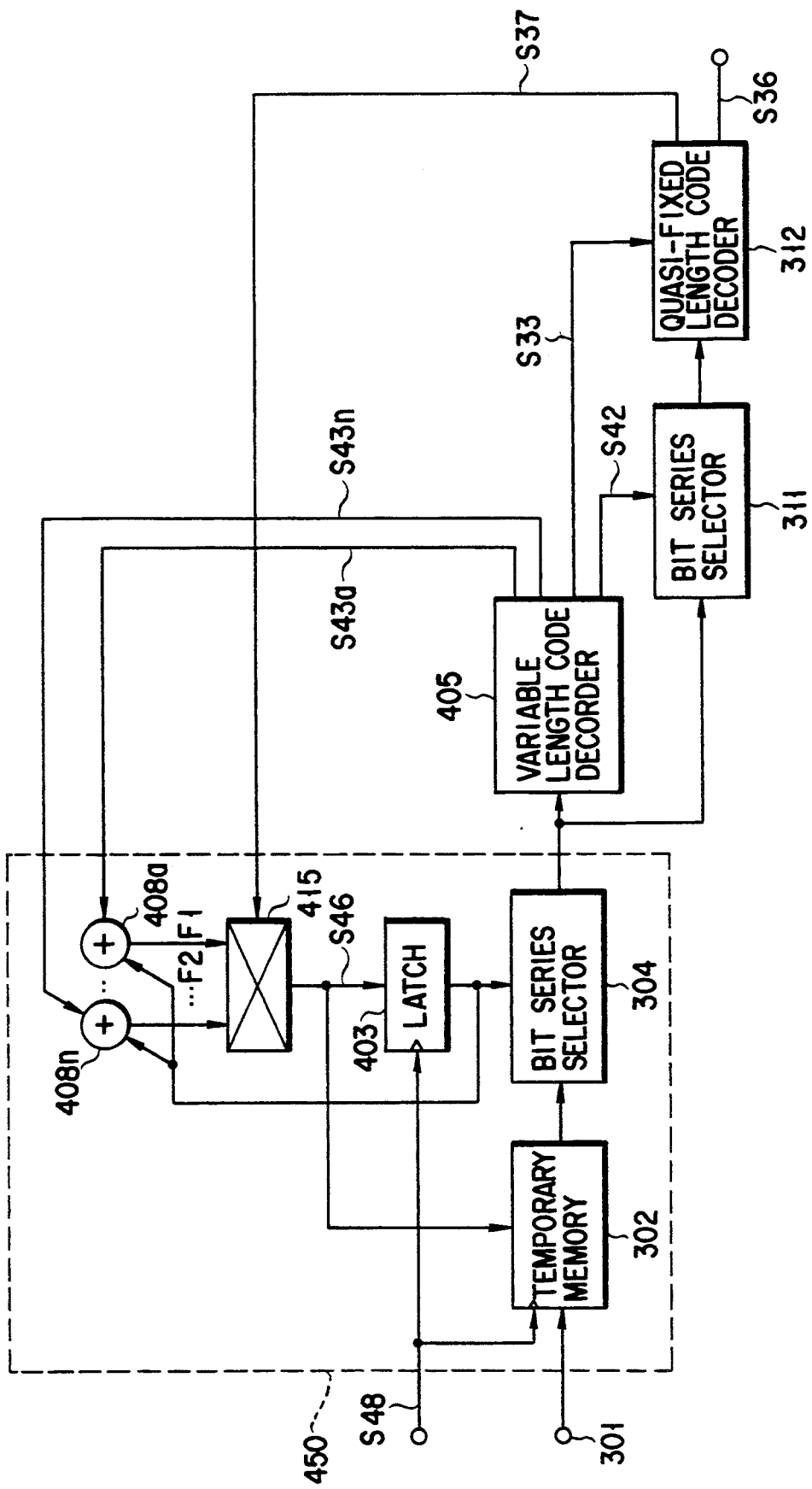
F I G. 28

| ST | LATCH 403 | INPUT TO SELECTOR 404 | OUTPUT FROM SELECTOR 404 | S41 | S43a | S43b | OUTPUT FROM SELECTOR 311 | S44 | S45 | S46 | REMAINDER | QUOTIENT |
|---|---|---|---|---|---|---|---|---|---|---|---|---|
| 0 | 0 | 0110011 1010111 | 0110011 | a | 1 | 1 | 110011 | a | F1 | 1 | 1 | 0 |
| 1 | 1 | 0110011 1010111 | 1100111 | c | 3 | 1 | 0111 | c | F1 | 4 | 4 | 0 |
| 2 | 4 | 0110011 1010111 | 0111010 | a | 1 | 1 | 111010 | a | F1 | 5 | 5 | 0 |
| 3 | 5 | 0110011 1010111 | 1110101 | QUASI-FIXED LENGTH | 5 | 7 | 0101 | e | F1 | 10 | 3 | 1 |
| 4 | 3 | 1010111 0011111 | 0111001 | d | 1 | 1 | 111001 | a | F1 | 4 | 4 | 0 |
| 5 | 4 | 1010111 0011111 | 1110011 | QUASI-FIXED LENGTH | 5 | 7 | 0011 | d | F1 | 9 | 2 | 1 |
| 6 | 2 | 0011111 1111000 | 1111111 | QUASI-FIXED LENGTH | 5 | 7 | 1111 | j | F2 | 9 | 2 | 1 |
| 7 | 2 | 1111000 0101010 | 1100001 | c | 3 | 1 | 0001 | c | F1 | 5 | 5 | 0 |
| ... | ... | ... | ... | ... | ... | ... | ... | ... | ... | ... | ... | ... |

F1: SELECT ADDER 408a
F2: SELECT ADDER 408b

F I G. 29

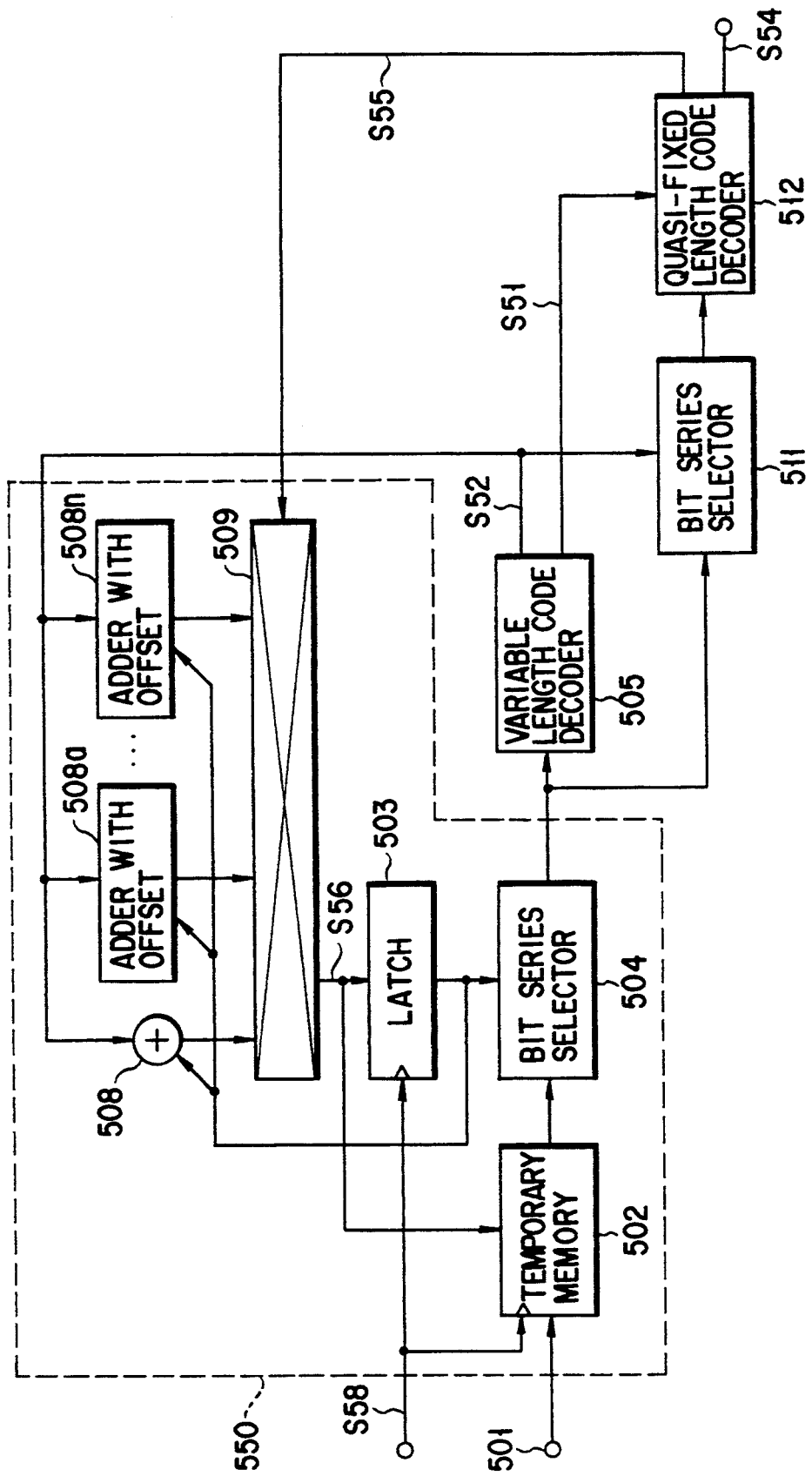
F I G. 30

| ST | LATCH 503 | INPUT TO SELECTOR 504 | OUTPUT FROM SELECTOR 504 | S51 | S52 | ADD. 508a | ADD. 508b | ADD. 508c | OUTPUT FROM SELECTOR 511 | S54 | S55 | S56 | REMAIN-DER | QUO-TIENT |
|---|---|---|---|---|---|---|---|---|---|---|---|---|---|---|
| 0 | 0 | 0110011 1010111 | 0110011 | a | 1 | 1 | 3 | 5 | 110011 | a | F1 | 1 | 1 | 0 |
| 1 | 1 | 0110011 1010111 | 1100111 | c | 3 | 4 | 6 | 8 | 0111 | c | F1 | 4 | 4 | 0 |
| 2 | 4 | 0110011 1010111 | 0111010 | a | 1 | 5 | 7 | 9 | 111010 | a | F1 | 5 | 5 | 0 |
| 3 | 5 | 0110011 1010111 | 1110101 | QUASI-FIXED LENGTH | 3 | 8 | 10 | 12 | 0101 | e | F2 | 10 | 3 | 1 |
| 4 | 3 | 1010111 0011111 | 0111001 | a | 1 | 4 | 6 | 8 | 111001 | a | F1 | 4 | 4 | 0 |
| 5 | 4 | 1010111 0011111 | 1110011 | QUASI-FIXED LENGTH | 3 | 7 | 9 | 11 | 0011 | d | F2 | 9 | 2 | 1 |
| 6 | 2 | 0011111 1111000 | 1111111 | QUASI-FIXED LENGTH | 3 | 5 | 7 | 9 | 1111 | j | F3 | 9 | 2 | 1 |
| 7 | 2 | 1111000 0101010 | 1100001 | c | 3 | 5 | 7 | 9 | 0001 | c | F1 | 5 | 5 | 0 |
| ... | ... | ... | ... | ... | ... | ... | ... | ... | ... | ... | ... | ... | ... | ... |

F1: SELECT ADDER 508a
F2: SELECT ADDER 508b
F3: SELECT ADDER 508c

F I G. 31

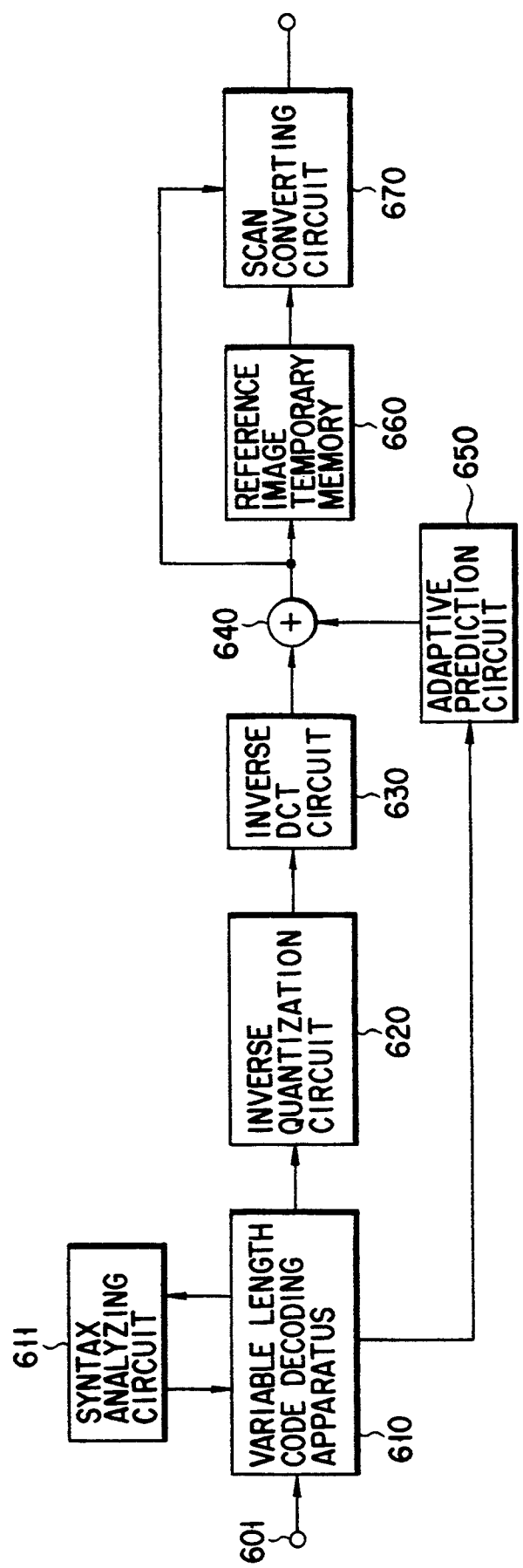
F I G. 32

METHOD OF DETECTING A MOTION VECTOR IN AN IMAGE CODING APPARATUS

BACKGROUND OF THE INVENTION

1. Field of the Invention

This invention relates to an image coding apparatus, and more particularly to an image coding apparatus based on an adaptive quantization coding system for dividing image information into a plurality of blocks and subjecting the divided image information blocks to compression coding.

2. Description of the Related Art

When image information is converted into digital form and recorded on a recording medium such as a tape or disk, it is necessary to reduce the data rate with the recording capacity of the recording medium taken into consideration. For this purpose, various studies concerning the low bit rate coding method for reducing the code amount by making use of the redundancy of image data have been made.

A method often used as the above image coding method includes an orthogonal transform coding method. With this method, input digital image data is divided into a plurality of data blocks each constructed by m×n pixels, subjected to the orthogonal transform such as two-dimensional discrete cosine transform (DCT) for each block, and each of coefficients (transform coefficients) obtained in the above transform is subjected to the quantization process with a predetermined quantizer step size. After this, each quantized transform coefficient is rearranged in a one-dimensional array and subjected to the run-length coding process and then the code amount thereof is reduced by also using the variable length coding process or the like.

In addition to the above basic construction, an attempt may be sometimes made to improve the visual image quality by adaptively and selectively setting the quantizer step size for each block and reducing the quantizer step size for the block in which quantization distortion may easily occur at the time of coding so as to suppress the quantization distortion. At this time, in order to suppress the code amount, the quantizer step size for the block in which quantization distortion will not easily occur is increased.

In order to adaptively set the quantizer step size for each block, it is necessary to classify the blocks into blocks in which visual deterioration in the image quality may easily occur and blocks in which visual deterioration in the image quality will not easily occur. In the prior art, attention was paid only to the block to be subjected to quantization and a quantization mode was set by use of parameters calculated by the values of the pixels thereof or the value of the transform coefficient. For example, in "STUDY OF LOW BIT RATE CODING METHOD FOR DIGITAL VTR", Television Institute at Annual Convention 7-1, 1990, the block to be quantized is further divided into sub-blocks, whether the sub-block is a flat portion or includes a significantly varying portion is checked, and then the quantization characteristic is determined according to the checking result. This method is based on the assumption that the block in which deterioration in the image quality is distinctly observed is a block which contains a flat portion and a significantly varying portion and deterioration in the image quality will not be distinctly observed in the block having a significantly varying portion in the entire portion of the block and having substantially no flat portion even when the block is roughly quantized.

The above method is relatively effective in order to suppress extremely bad influence which is caused by the ringing occurring when the orthogonal transform coefficient obtained in the block is roughly quantized and which is given to the flat portion in the block in a case where an edge occurs in the block.

However, in a case where the quantizer step size for each block is controlled with the visual characteristics taken into consideration, it is more effective to pay much attention to the rough pattern structure of the image. For example, in the case of an isolated small pattern lying in the large flat portion in the image, deterioration in the image quality seems prominent even when small quantization distortion has occurred. On the other hand, in the case of an image portion having a widely spreading no-standardized pattern with complicated structure, for example, the scenery of nature or an image portion of random pattern, much deterioration is not visually observed even when slight deterioration due to the quantization distortion has occurred. However, a block with a size of 8×8 pixels is generally used, and in this case, it is impossible to control the quantizer step size with the visual characteristics based on the rough pattern taken into consideration in the conventional method in which the quantizer step size is determined only by use of the block to be quantized. Particularly, in an image of high resolution, since the size of the block is extremely small in comparison with the image size, it is difficult to distinguish a portion, in which significant deterioration occurs, from a portion, in which the deterioration is not distinctly observed.

Further, in the conventional method, the quantization widths for adjacent blocks become greatly different from each other in some cases and the image deterioration partially abruptly changes in the image, thereby giving an unnatural impression.

SUMMARY OF THE INVENTION

An object of this invention is to provide an image coding apparatus capable of adequately controlling the quantizer step size by taking the visual characteristics based on the rough pattern of an image into consideration.

The above object can be attained by an image coding apparatus comprising an image information dividing circuit for dividing image information into a plurality of blocks each constructed by a preset number of pixels; a quantization circuit for quantizing data representing information in each of the blocks divided by the dividing circuit by use of a quantizer step size determined for each of the blocks; a coding circuit for coding data quantized by the quantization circuit; and a quantizer step size determining circuit for determining a parameter representing the degree of variation in the value of pixels in each of the blocks for each block and determining the quantizer step size of a corresponding one of the blocks by use of the value of the activity parameter determined for the corresponding one of the blocks and the value of the activity parameter determined for a block different from the corresponding block.

In this invention, the quantizer step size of each block can be determined with the subjective visual image deterioration based on the rough pattern taken into consideration by referring to the parameters of the blocks including the block whose quantizer step size is to be determined each time the quantizer step size is determined. Therefore, the coding process which may enhance the image quality can be more efficiently effected.

Further according to this invention, there is provided an image coding apparatus comprising a dividing circuit for dividing a video signal into a plurality of blocks including a preset number of pixels; a circuit for deriving an activity representing the complexity of the video signal for each block; a block order setting circuit for setting the order of the blocks according to the activity of the video signal; and a coding circuit for coding the blocks in the order set by the block signal order setting circuit.

In the above image coding apparatus, the video signal is divided into a plurality of blocks each constructed by a signal having a plurality of pixels, the activity of the video signal is derived for each block, the order of the blocks is set according to the activity and then the blocks are coded in the order thus set so that the quantization scale having less variation on the image plane can be selected and a preferable quantization process can be attained.

Further, according to this invention, there is provided an image coding apparatus comprising a filter circuit for subjecting image signals of the coded image plane and input image plane to the low-pass filtering process for suppressing spatial high frequency components; a sub-sampling circuit for extracting a partial image signal from the image signal subjected to the filtering process at a regular image pixel interval; a first motion vector detection circuit for detecting motion vector information indicating an area of the subsampled and coded image plane from which a partial area of the sub-sampled input image plane is moved; a second motion vector detection circuit for detecting motion vector information indicating an area of the coded image plane from which a partial area of the input image plane is moved by use of the coded image plane and the input image plane prior to the low-pass filtering process and sub-sampling process; and a control circuit for controlling a search pixel unit in the second motion vector detection circuit according to the type of the motion vector information derived from the first motion vector detection circuit.

Further, according to this invention, there is provided an image coding apparatus comprising a dividing circuit for dividing input image data into a plurality of blocks each constructed by a preset number of pixels; a setting circuit for setting the search range, and search accuracy of the motion vector for each block; a vector candidate generating circuit for selectively generating a plurality of motion vector candidates for specifying a reference image block with respect to the input image block from the coded image within the search range designated by the search center and area which are set for each block; a calculating circuit for calculating a value which is used as an index for the magnitude of a prediction difference between the input image block and the reference image block specified by a plurality of motion vector candidates; a selection circuit for selecting an optimum motion vector by use of the value used as the index; and a coding circuit for coding a difference signal indicating a difference between the input image block and a reference block specified by the optimum motion vector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2 to 2C are diagrams for illustration of the adaptive quantization in this invention;

FIG. 3 is a diagram showing an example of a variation in the quantizer step size caused by the adaptive quantization;

FIG. 4 is a diagram showing a characteristic of a variation in the quantizer step size for activity;

FIG. 5 is a diagram for illustrating the adaptive quantization in the first embodiment of this invention;

FIG. 8 is a block circuit diagram showing an image coding apparatus according to a fourth embodiment of this invention;

FIG. 12 is a block diagram showing an image coding apparatus according to a fifth embodiment of this invention;

FIG. 13 is a block diagram showing a decoding apparatus for the image coding apparatus shown in FIG. 12;

FIG. 19 is a diagram for illustration of the process of setting the search center;

FIGS. 20A to 20D are diagrams showing vector candidates and the index values thereof;

FIG. 21 is a diagram for illustration of the process of setting the search range and vector candidate;

FIG. 22 is a diagram for illustration of the process of re-setting the search parameter;

FIG. 23 is a diagram showing an image coding apparatus according to the seventh embodiment;

FIG. 24 is a block diagram showing a motion compensation circuit and search range setting circuit;

FIG. 25 is a block diagram showing a variable length code decoding apparatus according to an eighth embodiment of this invention;

FIG. 26 is a diagram showing a variable code table;

FIG. 27 is a diagram showing a table of signals on various parts of the apparatus of FIG. 25;

FIG. 28 is a block diagram showing a variable length code decoding apparatus according to a ninth embodiment of this invention;

FIG. 29 is a diagram showing a table of signals on various parts of the apparatus of FIG. 28;

FIG. 30 is a block diagram showing a variable length code decoding apparatus according to a tenth embodiment of this invention;

FIG. 31 is a diagram showing a table of signals on various parts of the apparatus of FIG. 30; and FIG. 32 is a block diagram showing the whole construction of an image decoding system using the above variable length code decoding apparatus.

DETAILED DESCRIPTION OF THE PREFERRED EMBODIMENTS

Figure 1:
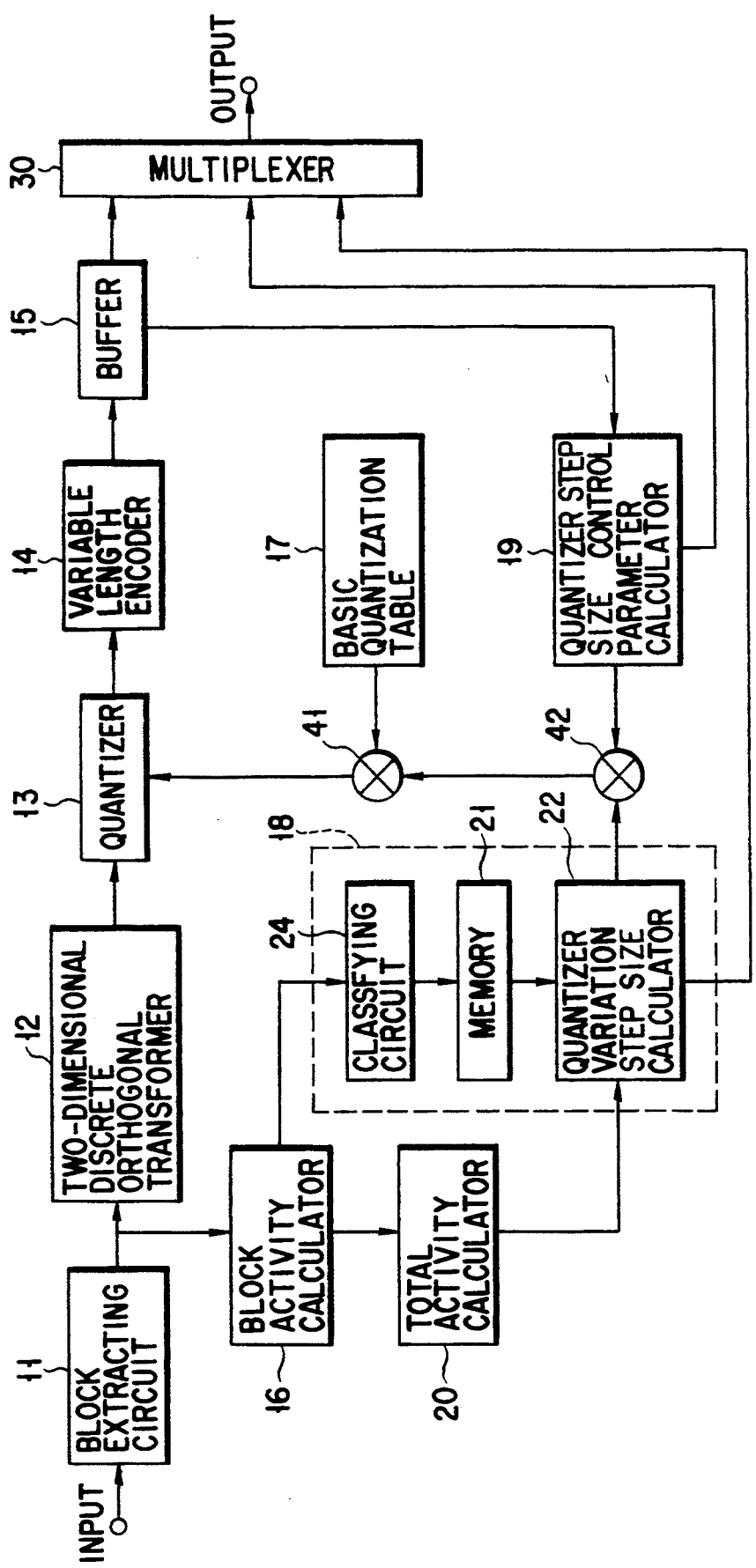
FIG. 1 is a block diagram showing an image coding according to a first embodiment of this invention.

FIG. 1 shows an image coding apparatus according to a first embodiment of this invention and used for image compression by the discrete orthogonal transform. In the above image coding apparatus, digital image data which is an input signal is extracted in the form of blocks each having, for example, dimensions of 8×8 pixels in a block extracting circuit 11 and then input to a two-dimensional discrete orthogonal transform circuit 12 so as to be subjected to the two-dimensional discrete orthogonal transform, for example, two-dimensional DCT for each block. The output of the two-dimensional discrete orthogonal transform circuit 12 is transform coefficient data and is quantized in a quantizer 13 by use of the quantizer step size calculated by a quantizer step size setting method which will be described later so as to reduce the amount of information. An output of the quantizer 13 is input to a variable length quantization circuit 14 and the code amount thereof is reduced by effecting the variable length coding process such as the Huffman coding process. Coded data output from the variable length quantization circuit 14 is stored in a buffer 15.

The quantizer step size in the quantizer 13 is calculated by means of multipliers 41 and 42. In this example, the multiplier 42 multiplies a reference value of the quantization scale calculated by a quantizer step size control parameter calculator 19 by the amount of variation from the reference value of the quantization scale calculated by an adaptive quantization control circuit 18 which is newly provided according to this invention, and the multiplier 41 multiplies the result of multiplication by the multiplier 42 by a value used for determining the rate of quantizer step size with respect to the transform coefficient and set in a basic quantization table 17.

In the quantizer step size control parameter calculator 19, the code amount output from the buffer 15 is monitored according to the state of the buffer occupied by the codes generated from the variable length quantization circuit 14 so as to keep the code amount less than the set code rate, and the quantization scale is controlled according to the code amount. That is, if the generated code amount is larger than a preset value, the quantizer step size is increased by increasing the quantization scale by the quantizer step size control parameter calculator 19 so as to suppress the code amount. In contrast, if the generated code amount is less than the preset value, the quantizer step size is deceased by decreasing the quantization scale so as to enhance the image quality and increase the generated code amount to the set code rate.

Thus, the quantizer step size control is effected according to the result of calculation by the quantizer step size control parameter calculator 19 to attain a proper code rate by changing the quantizer step size according to the property of input image data. In the above quantizer step size control operation, the quantizer step size is changed without taking visual deterioration in the image quality into consideration and therefore a waste occurs in the code amount allotted in the image. That is, it is desired to further increase the quantizer step size so as to reduce the code amount in an image portion which is not so important for visual observation and improve the image quality from the subjective viewpoint by decreasing the quantizer step size by a corresponding amount in an image portion in which deterioration is distinctly observed. The above control operation is effected in the adaptive quantization control circuit 18.

Now, the controlling method effected by the adaptive quantization control circuit 18 is explained with reference FIG. 2.

Consider a case wherein the quantizer step size of a block lying at the center of nine blocks shown in FIG. 2A is determined. First, an activity parameter (which is called block activity) indicating that the block is a flat image block having less image variation or an image block having significant image variation is calculated for each block in a block activity calculator 16. In other words, the block activity indicates the degree of difficulty in coding and the greater value indicates the higher degree of difficulty in coding. In this embodiment, as the block activity, (1) the sum of absolute values of differences between the mean value of values of the pixels in the block and values of the respective pixels is used, but it is also possible to use (2) the sum of the squares of differences between the mean value of values of the pixels in the block and values of the respective pixels, (3) the sum of absolute values of differences between the adjacent pixels, or (4) the sum of absolute values of those of DCT transform coefficients except the D.C. components.

In this embodiment, adaptive quantization is effected with the quantization size selectively set to four different levels. In the adaptive quantization control circuit 18, the variation step size for quantization is set by the following steps.

First, as the first step, the blocks are classified into four classes according to the magnitude of the block activity by a classifying circuit 24. The four classes are respectively denoted by A, B, C and D in an order from the large block activity to the small block activity. Class information of the respective blocks is stored in a memory 21.

Next, as the second step, when the central block whose quantizer step size is to be determined is classified into the D class as shown in FIGS. 2B and 2C, the classes of the other eight blocks surrounding the central block are checked and whether the number of blocks classified into the D class is less than a preset value (for example, 3) or not is checked. When the number of those of the surrounding eight blocks which are classified into the D class exceeds the preset value as shown in FIG. 2B, it is kept unchanged, and when the number of blocks is not larger than the preset value as shown in FIG. 2C, the operation of changing the central block into the A class is effected for all of the blocks in the image.

After this, as the third step, variations in the quantizer step size are determined for the respective classes as shown in FIG. 3. FIG. 3 shows the amounts of variation in the quantization widths corresponding to the respective classes A to D from the reference value with respect to the block activity, and in this example, the quantizer step size corresponding to the C class is set to coincide with the reference quantizer step size obtained in the quantizer step size control parameter calculator 19.

That is, it is determined that an image area in which blocks of large activity are concentrated is a portion in which deterioration in the image quality is not visually distinctly observed and the quantizer step size is increased. In contrast, since deterioration in an image area in which the activity is relatively small is noticeable, the quantizer step size is decreased to enhance the image quality. In addition, in a case wherein a block of large activity independently lies in a relatively flat image area, deterioration in the block becomes noticeable and therefore the quantizer step size is decreased to suppress the deterioration.

The block which is classified into the A class from the beginning in the first step corresponds to a flat image area. Since, in the above area, deterioration due to the block distortion occurs when the quantizer step size is increased, the quantization size is reduced, but since the amount of information in the block is originally small, an increase in the code amount caused by decreasing the quantizer step size is not so significant. Therefore, in the first step, a larger code amount can be allotted to a block which is classified into the D class and in which distortion is distinctly observed, and as the result, the image improving effect can be enhanced.

In FIG. 3, variation amounts of the quantization widths of the blocks belonging to the A class to the D class from the reference value are determined according to the number of blocks classified into the respective classes in one image plane. That is, the generated code amount obtained when the block is set to a certain quantizer step size is predicted, the quantization widths of the blocks belonging to the A and B classes are decreased and set to such quantization widths that an increase in the code amount which substantially corresponds to a reduction from the code amount in one image plane caused when the reference value is used can be obtained when the quantizer step size ΔQ of the block belonging to the D class is increased from the reference value to a value which may provide permissible visual observation.

At this time, the visually permissible quantizer step size of the block belonging to the D class varies according to the activity of the entire image plane, and the variation amount of the quantizer step size which can be permitted becomes smaller as the activity of the entire image plane becomes larger. This relation is indicated in FIG. 4, and in FIG. 4, the ordinate indicates the activity (total activity) of the entire image plane and the abscissa indicates the quantizer step size ΔQ of the block belonging to the D class.

The quantization parameters obtained in the quantizer step size control parameter calculator 19 and the adaptive quantization control circuit 18 are multiplexed with coded image data in a multiplexer 30 and output therefrom.

In the first embodiment, a preferable result can be obtained by the operation of setting the quantizer step size by effecting the process up to the third step in the adaptive quantization control circuit 18. However, if the block can be classified into more classes, additional improvement may be made in order to alleviate a sense of unnatural visual observation caused by discontinuous variation in the image quality which will occur when the quantizer step size is abruptly changed in the image plane.

Figure 6:
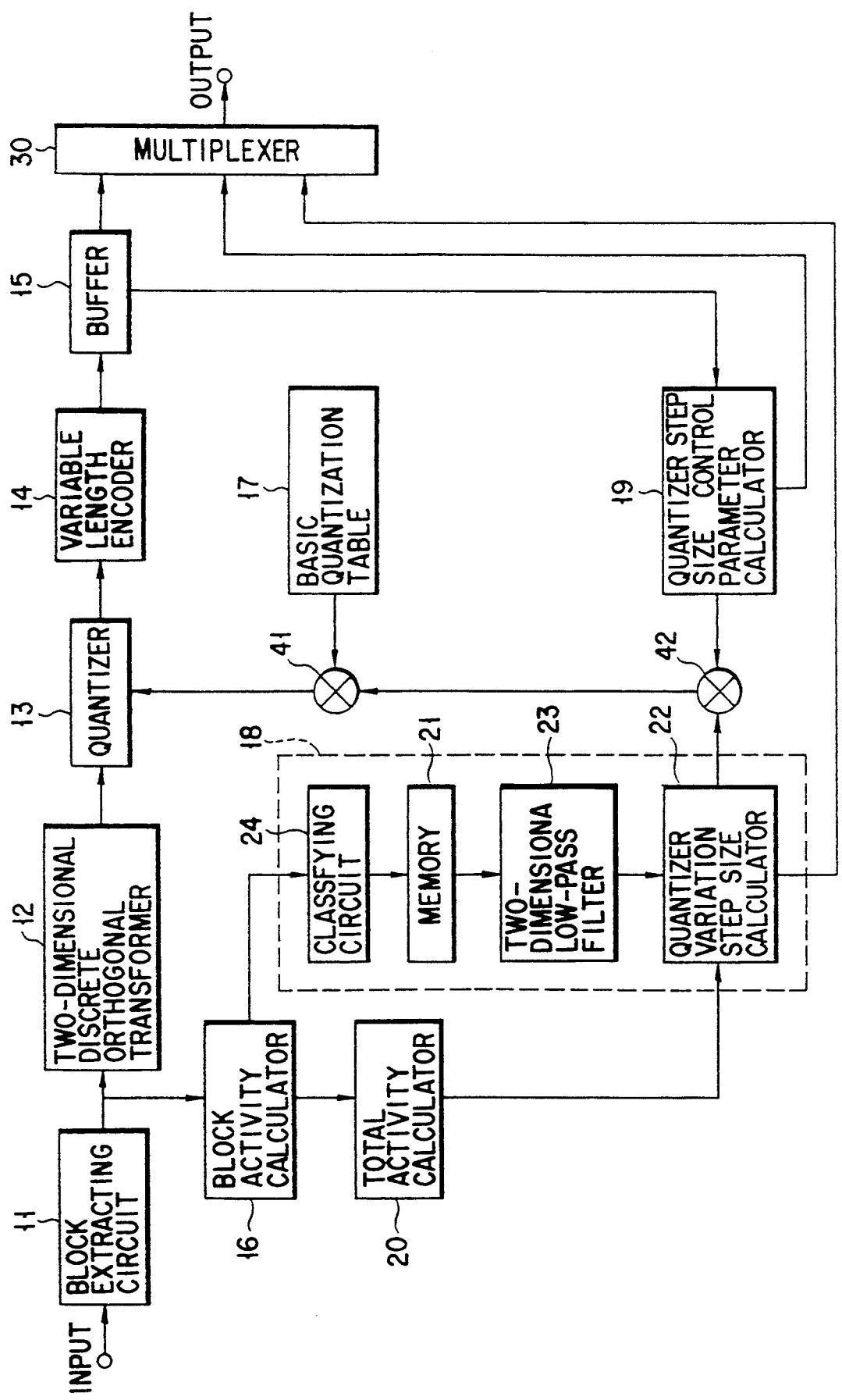
FIG. 6 is a block diagram showing an image coding apparatus according to a second embodiment of this invention.

FIG. 6 shows a second embodiment in which the above improvement is made, and in the second embodiment, a two-dimensional low-pass filter 23 is newly provided in the adaptive quantization control circuit 18 in addition to the structure of the first embodiment shown in FIG. 1. In this embodiment, a two-dimensional array made by variation widths of quantization of the respective blocks obtained in the third step of the first embodiment is used and the two-dimensional low-pass filter 23 is applied to the above two-dimensional array so as to prevent the quantizer step size from being abruptly changed in the respective image areas.

This invention can also be applied to an image coding apparatus using the interframe prediction. In the interframe prediction, since images of a plurality of frames which are successively arranged on the time base as shown in FIG. 6, information derived from the adjacent blocks in the time base direction can be used when the adaptive quantization is effected and therefore it becomes possible to prevent the image quality from being abruptly changed with time and alleviate a sense of unnatural visual observation.

Figure 7:
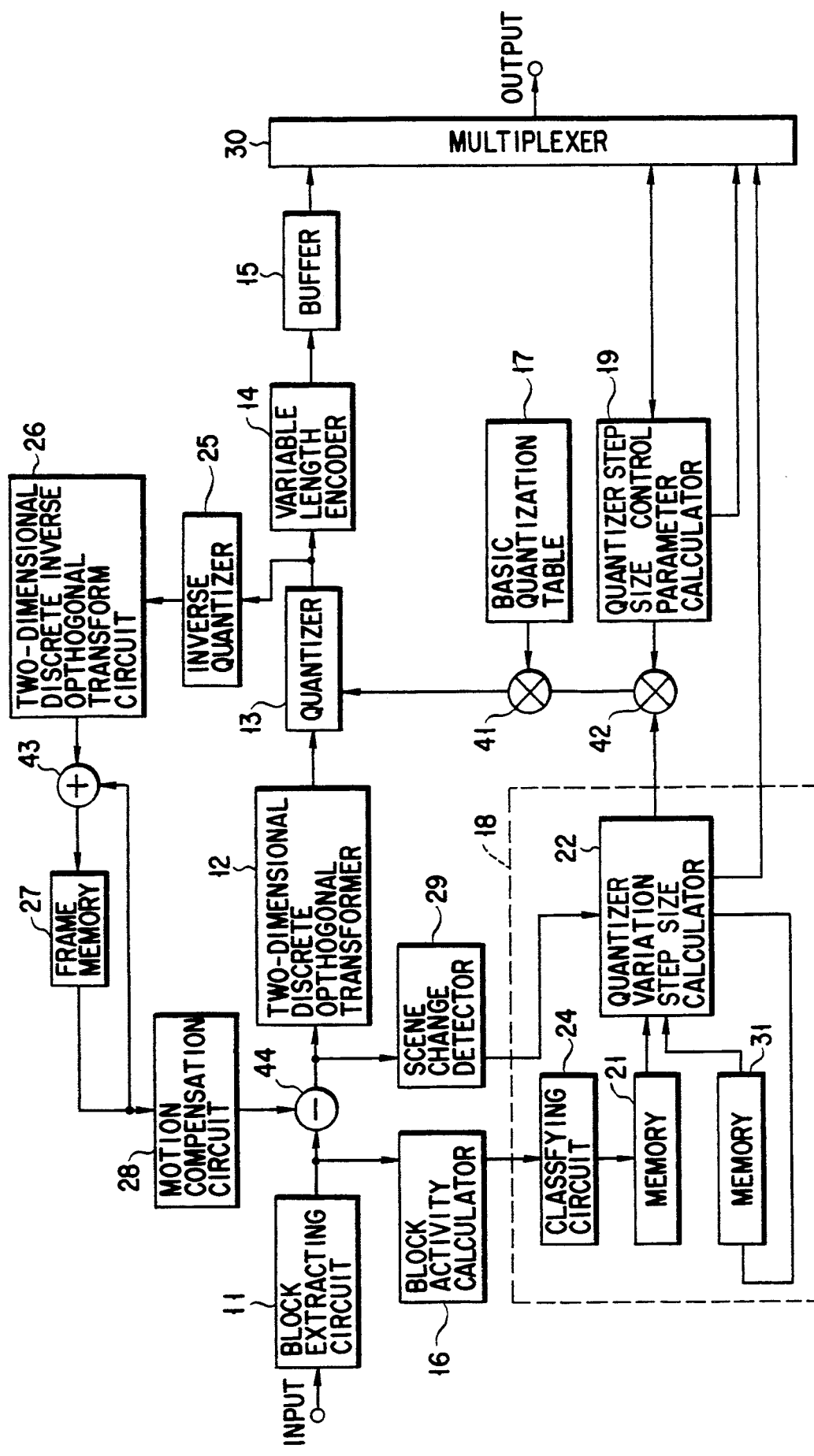
FIG. 7 is a block diagram showing a third embodiment of this invention obtained by applying this invention to an image coding apparatus utilizing the interframe prediction process.

FIG. 7 shows a third embodiment of this invention obtained by applying this invention to an image coding apparatus utilizing the interframe prediction process. In this embodiment, an image signal in the immediately preceding frame is derived by locally decoding an output of a quantizer 13 by means of an inverse quantizer 25, two-dimensional discrete inverse orthogonal transform circuit 26, adder 43 and frame memory 27 and is subjected to the motion compensation process in a motion compensating circuit 28. A subtracter 44 derives a difference between an output of the motion compensating circuit 28 and an input image signal, and the difference which is a prediction residual signal is subjected to the orthogonal transform such as DCT in a two-dimensional discrete orthogonal transform circuit 12. The transform coefficient thus derived in the transform circuit 12 is quantized in the quantizer 13 and then subjected to the variable length coding process in a variable length quantization circuit 14.

Like the first embodiment, the quantizer step size in this embodiment is set by subjecting a coefficient which is derived according to the code amount of variable length codes stored in the buffer 15 to the correcting process based on the adaptive quantization of this invention by use of the quantizer step size control parameter calculator 19 and multiplying the thus corrected coefficient value by a value corresponding to the quantization scale of the basic quantization table 17.

In this embodiment, class information classified by the classifying circuit 24 for a frame which is to be coded in the adaptive quantization control circuit 18 is stored into the first memory 21, and class information which is finally derived for the preceding frame is stored in the second memory 31. The corrected value of the quantizer step size is derived by use of a value of the quantizer step size and an output of a scene change detector 29.

In this case, when a variation in the quantizer step size in the central block of FIG. 6 is derived, information of the eight blocks which are spatially adjacent to the central block and information of a block which lies before the block in time but lies in the same spatial position are used.

First, the process of the first and second steps in the first embodiment is effected by use of information of the spatially adjacent blocks and classification into the classes obtained in the classifying circuit 24 is corrected.

Next, the classes are compared with the class of the block in the preceding frame, and when it is determined that a difference therebetween is larger than a preset value, for example, a value of two classes, the class is corrected to reduce the difference by one step. For example, when the block is classified into the D class as the result of the second step and if the block lying in the same position in the preceding frame is classified into the A class or B class, the class of the block is corrected to the C class. Class information finally obtained is stored into the memory 31 so as to be used for determination of the corrected value of the quantizer step size in the next frame. However, if a scene change is detected by the scene change detector 29, correction by use of information of the blocks which are successive on the time base is not effected.

As the last step, the value of variation in the quantizer step size shown in FIG. 3 is determined according to the finally determined class of the block.

In the above embodiments, in order to simplify the calculation, the blocks are first classified into the four classes based on the block activity, and the thus classified class is corrected according to the classes of the surrounding blocks, but it is also possible to determine the quantizer step size of the central block by directly using the activities of the surrounding blocks.

Further, in the above embodiments, the adaptive quantization control circuit 18 and the quantizer step size control parameter calculator 19 in the operation of setting the quantizer step size are separately explained for brief understanding, but it is sometimes advantageous to unify the functions of the adaptive quantization control circuit 18 and the quantizer step size control parameter calculator 19 so as to effect the adaptive quantization control operation.

Next, an image coding apparatus according to a fourth embodiment of this invention is explained with reference to FIG. 8.

The image coding apparatus includes a blocking circuit 50, activity measuring circuit 51 for each block, block ordering circuit 52, quantizing device 53 and block order inverting circuit 54. The quantizing device 53 includes a target code amount setting circuit 55, generated code-amount measuring circuit 56, quantization measuring circuit 57 and quantizer 58.

The blocking circuit 50 converts an input video signal into a plurality of blocks each constructed by an information signal with a preset number of pixels and outputs the blocks to the activity measuring circuit 51 and block ordering circuit 52. Each of the blocks is used as a quantization control unit, and in this embodiment, one line of the video signal is set as one block. The activity measuring circuit 51 derives activity Act(i) indicating the complexity of each block and outputs the measured value to the block ordering circuit 52 and the target code-amount setting circuit 55 of the quantizing device 53. As the activity, dispersion of the block may be used, for example. The block ordering circuit 52 converts the original order of the blocks to another block order by use of a preset method according to the activity measurement value of each block of the activity measuring circuit 51 and outputs the converted block to the quantizer 58. For example, a method of first outputting a block having the largest activity, then outputting a block having the smallest activity, outputting a block having the second largest activity, and thus sequentially and alternately outputting blocks having the large and small activities may be considered. The quantizing device 53 quantizes a video signal output from the block ordering circuit 52 and outputs the quantized signal to the block order inverting circuit 54.

Next, the internal structure of the quantizing device 53 is explained.

In the target code-amount measuring circuit 55, the target code amount Trg(i) of each block is set by the activity Act(i) of a corresponding one of the blocks. For example, when the code amount for one image plane is Bits pic, Trg(i) is set according to the following equation.

$$Trg(i) = \text{Bits } pic * Act(i) / \sum_{k=0}^{N-1} Act(k)$$

The generated code-amount measuring circuit 56 calculates the generated code amount Use(i) of the quantized block and outputs the calculated code amount to the quantization control circuit 57. The quantization control circuit 57 calculates the amount Buf(k) of the codes stored in an imaginary buffer based on the target code amount and generated code amount in a range up to the block k which has been quantized by use of the following equation.

$$Buf(k) = \sum_{k=0}^{N-1} (Use(k) - Trg(k))$$

The quantization control circuit 57 determines the quantization scale for a next block (k+1) according to the amount of the codes stored in the imaginary buffer. In order to effect a method of determining the quantization scale, the positive and negative maximum values of the imaginary buffer are determined, the largest quantization scale is selected when the amount of the codes stored in the imaginary buffer is set to the positive maximum amount, and the smallest quantization scale is selected when the amount of the codes stored in the imaginary buffer is set to the negative maximum amount, for example. The quantization scale thus determined is output to the quantizer 58 as the quantization scale for the next block. The quantizer 58 quantizes one block according to the quantization scale determined by the quantization control circuit 57 and outputs quantization data to the generated code-amount measuring circuit 56 and block order inverting circuit 54. The block order inverting circuit 54 resets the block order of the quantized video signal to the same order as the order of inputs to the block ordering circuit 52 and outputs the video signal.

Figure 9A:
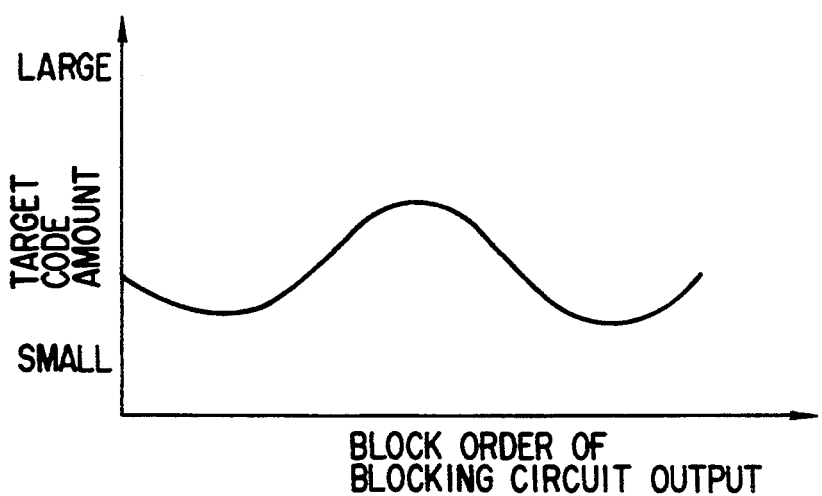
FIGS. 9A and 9B are diagrams respectively showing a variation in the rate of occupation of the buffer and a variation in the quantization scale after the block order setting process in this invention.
Figure 9B:
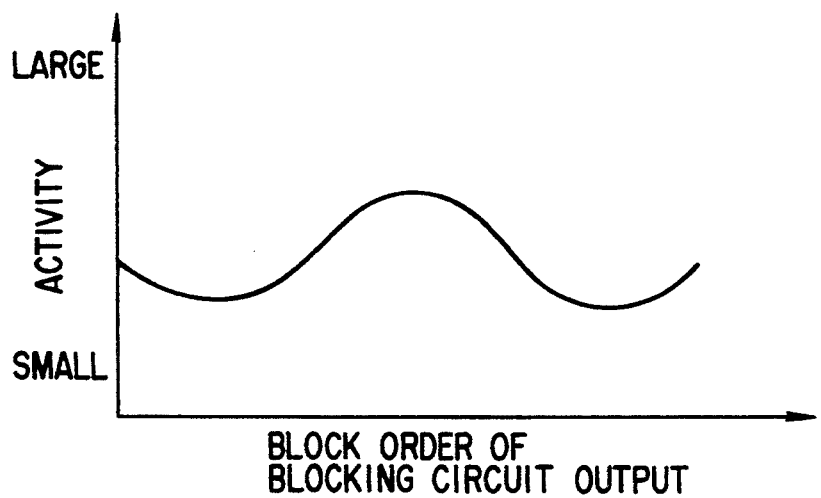
Figure 10A:
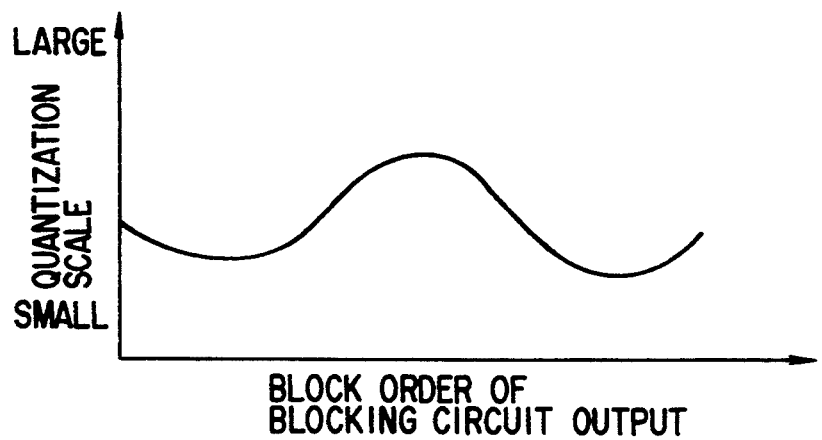
FIGS. 10A and 10B are diagrams respectively showing the magnitude of activity of each block and the target code amount prior to the block order setting process in this invention.
Figure 10B:
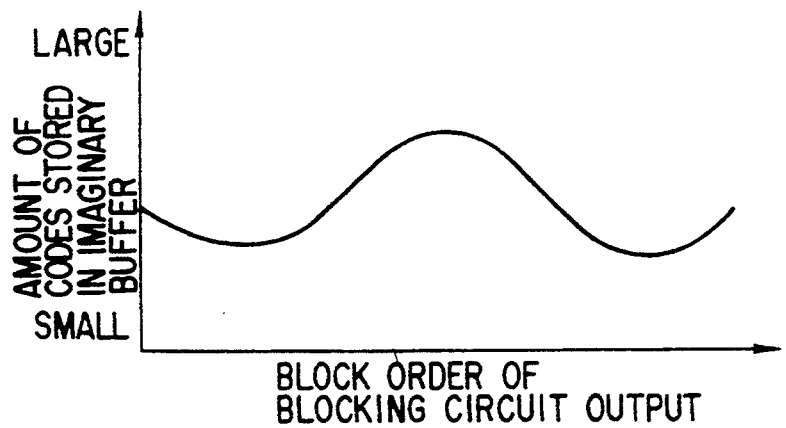

In FIGS. 9A and 9B, the target code amount and the magnitude of the activity of each block with respect to the input block order set before the block order resetting process is effected are respectively shown. It can be understood that a block having a large activity is a fine pattern portion and a large target code amount is set, and a block having a small activity is a flat portion and a small target code amount is set. In FIGS. 10A and 10B, a variation in the quantization scale and a variation in the amount of the codes stored in the imaginary buffer after the block quantization in a case where the quantization is effected without effecting the block ordering operation are respectively shown. In the fine pattern portion, the amount of the codes stored in the imaginary buffer becomes large, and as the result of this, the quantization scale becomes large. Further, in the flat pattern portion, the amount of the codes stored in the imaginary buffer becomes small, and as the result of this, the quantization scale becomes small. Therefore, in the entire image plane, the quantization scale is changed and a large quantization error occurs in the fine pattern portion, thereby causing the image quality to be deteriorated.

Figure 11A:
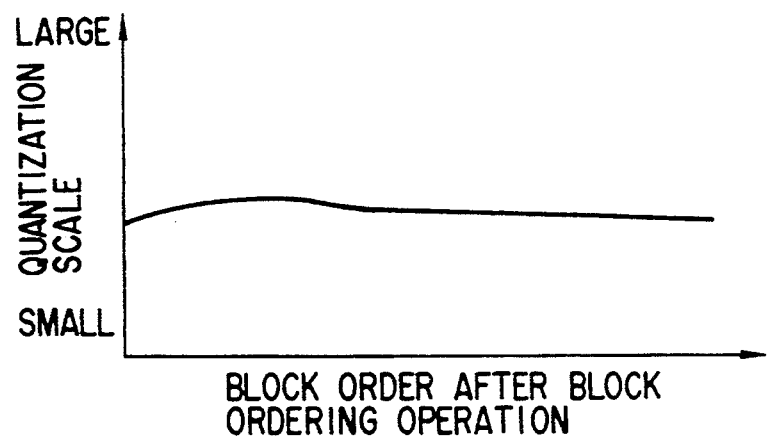
FIGS. 11A and 11B are diagrams respectively showing a variation in the rate of occupation of the buffer and a variation in the quantization scale after the quantization is effected without setting the block order.
Figure 11B:
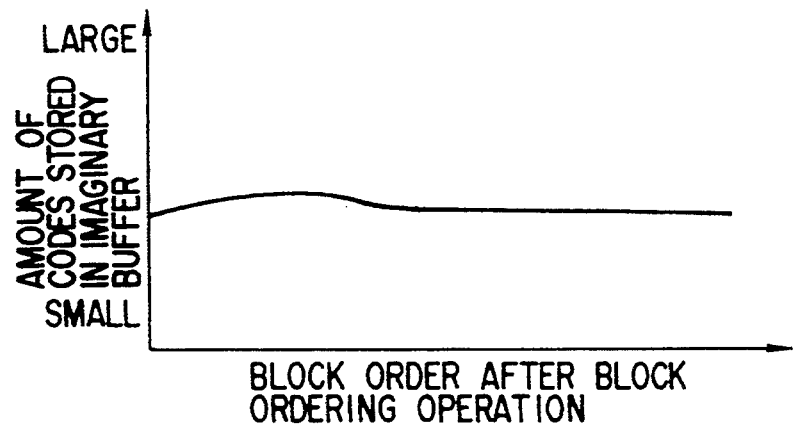

FIGS. 11A and 11B respectively show a variation in the quantization scale and a variation in the amount of the codes stored in the imaginary buffer after the block quantization in a case where the block ordering operation is effected and then the quantization is effected. The abscissa indicates the order of blocks input to the quantization circuit 53 after the block ordering operation is effected. A variation in the amount of the codes stored in the imaginary buffer is not largely dependent on the pattern and is reduced. As a result, a variation in the quantization scale is also reduced, a substantially uniform quantization scale is selected in the image plane and preferable quantization can be attained.

Next, a fifth embodiment of this invention is explained with reference to FIGS. 12 and 13.

This embodiment is an example in which the block order inverting operation is effected by use of a coding device. A coding device shown in FIG. 12 includes a blocking circuit 60, block activity measuring circuit 61, block ordering circuit 62, quantizing circuit 63, quantization control circuit 64 and transmission buffer circuit 65. An image decoding device shown in FIG. 13 includes a reception buffer circuit 70, inverse quantizer 71, block order inverting circuit 72 and inverse blocking circuit 73. The blocking circuit 60 converts an input video signal into blocks. The block is used as a unit for quantization control. In this embodiment, one line of the video signal is used as one block. The activity measuring circuit 61 derives an activity Act(i) indicating the complexity of each block. As the activity, dispersion of the block may be used, for example. The block ordering circuit 62 converts the order of the blocks according to the activity measurement value of each block of the activity measuring circuit 61. A block having the largest activity is output, then a block having the smallest activity is output, a block having the second largest activity is next output, and thus blocks having the large and small activities are sequentially and alternately output. The quantizing device 63 quantizes an image signal output from the block ordering circuit 62 according to the quantization scale controlled by the quantization control circuit 64 and outputs the quantized image signal to the transmission buffer circuit 65. The quantization control circuit 64 determines the quantization scale according to the amount of the codes stored in the transmission buffer circuit 65 to control the quantizer 63. The transmission buffer circuit 65 outputs coded image data to a transmission line.

Next, the operation of the decoding device for decoding image data coded by the image coding device is explained.

Coded image data input via the transmission line is supplied to the quantizer 71 via the reception buffer 70. The quantizer 71 subjects the input coded image data to the inverse quantization and outputs data obtained as the result of inverse quantization to the block order inverting circuit 72. The block order inverting circuit 72 inversely sets the order of the blocks to the same order as the input order of blocks to the block ordering circuit 62. The inverse blocking circuit 73 inversely sets the image signal which is divided into the blocks to the format of the input image signal of the blocking circuit 60.

According to the above embodiment, an image on the image plane is divided into blocks, the activity of the image is determined for each block, and the blocks are rearranged to make the activity uniform so that a quantization scale which causes less variation in the image plane can be selected, thereby attaining preferable quantization.

Next, a motion vector compensation prediction coding device for coding a difference between motion information indicating an area from which a partial area is moved and an area indicated by the motion vector information is explained.

Figure 14:
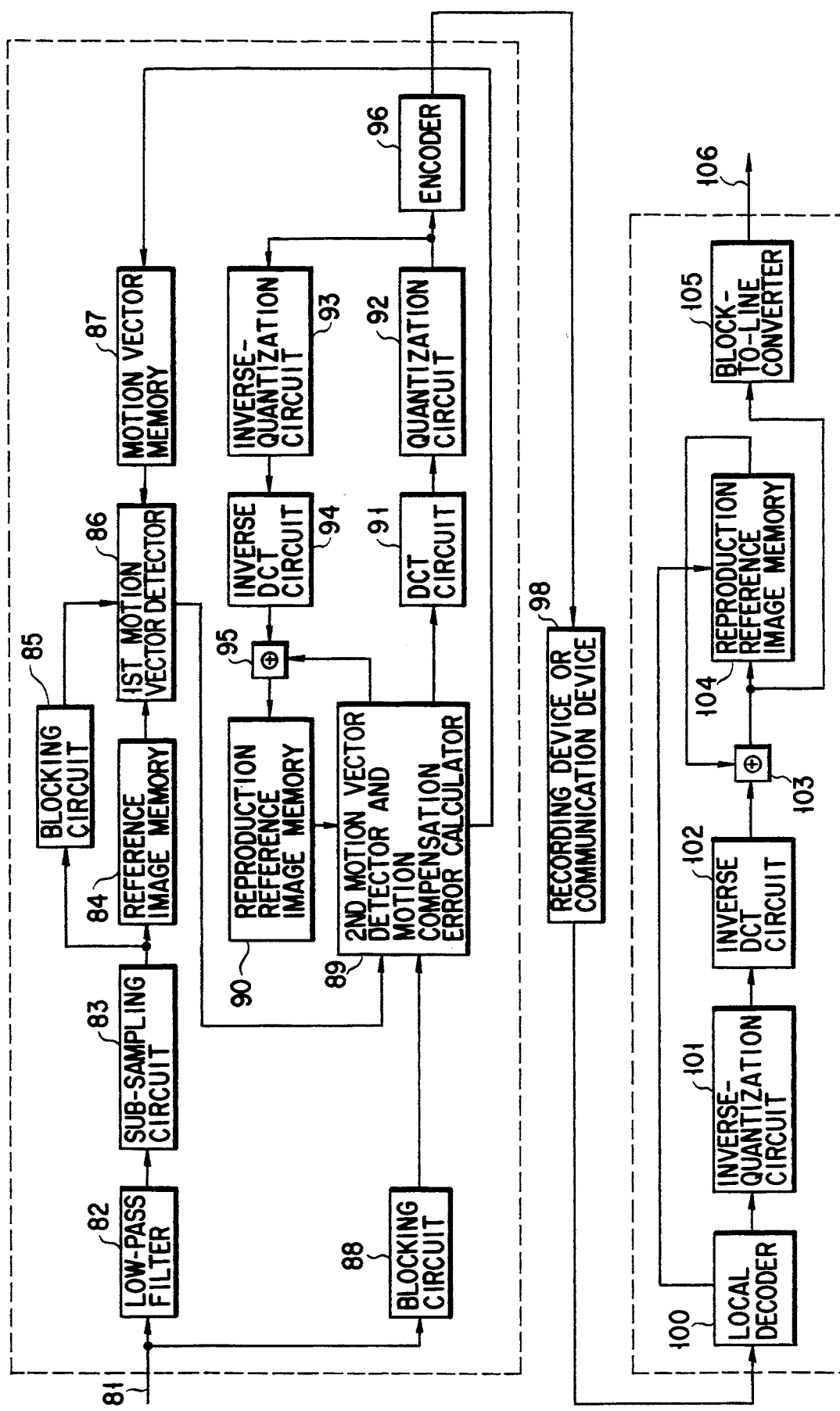
FIG. 14 is a block diagram showing an image coding apparatus and decoding apparatus according to a sixth embodiment of this invention.

According to the sixth embodiment shown in FIG. 14, a low-pass filter circuit 82 subjects an image signal sequentially input via an input line 81 to the low-pass filtering process for suppressing the spatial high frequency components of the image signal and outputs the processed image signal. A sub-sampling circuit 83 effects the sampling operation for extracting a partial image signal from the image signal subjected to the filtering process in the low-pass filter circuit 82 at a preset pixel interval. A reference image memory 84 stores an upper-layer image signal shown in FIG. 19 and created by the sub-sampling circuit 83 and outputs the upper-layer image signal on the image plane which has already been subjected to the coding process. A first blocking circuit 85 outputs an upper-layer image signal of the image signal which is created by the sub-sampling circuit 83 and will be next coded in a block unit constructed by a plurality of pixels. A first motion vector detector 86 searches the upper-layer image signal of the coded image stored in the reference image memory 84 for a primary detection block having a comparatively high correlation with a block of the upper-layer image signal of the input image plane in a preset searching range having a point indicated by a motion vector previously stored in the motion vector memory 87 as a central point and outputs the primary motion vector indicating the position of the primary block. A second blocking circuit 88 outputs an image signal sequentially input via the input line 81 in the block unit constructed by a plurality of pixels. A second motion vector detector 89 controls at least one of the central position of a range to be searched and the pixel unit to be searched for according to the type of the primary motion vector output from the first motion vector detector 86, searches a local reproducing image for reference stored in a reproducing reference image memory 90 for a secondary detection block having the highest correlation with a block of the input image plane, outputs image data of the secondary detection block to a local reproduction calculator 95, outputs data of a difference between the block of the input image plane and the secondary detection block thereof to a DCT circuit 91, and outputs a secondary motion vector indicating the position of the secondary detection block to an encoder 96 and the motion vector memory 87. The motion vector memory 87 converts the secondary motion vector into data of the primary motion vector for each searched pixel and stores the data which is used for search for the primary motion vector of the next coded image plane. The DCT circuit 91 subjects the difference data for each block output from the secondary motion vector detector 89 to the discrete cosine transform and outputs the result. A quantization circuit 92 quantizes data output from the DCT circuit 91 by dividing the data by a preset quantizer step size. The encoder 96 encodes a motion vector output from the secondary motion vector detector 89 and quantized DCT data output from the quantization circuit 92 and outputs the coded data. An inverse-quantization circuit 93 subjects data output from the quantization circuit 92 to the inverse quantization by effecting multiplication of the data according to the quantizer step size used for the coding operation when an image plane to be used later as a reference image plane is coded. An inverse DCT circuit 94 subjects data for each block output from the inverse-quantization circuit 93 to the inverse discrete cosine transform so as to restore the difference data. The local reproduction calculator 95 adds together image data of the secondary detection block output from the secondary motion vector detector 89 and the restored difference data output from the inverse DCT circuit 94 and outputs the result of addition to the reproduction reference image memory 90.

The thus coded data is input to a local decoder 100 via a communication device or recording device 98. The local decoder 100 decodes motion vector information and quantized DCT data, outputs the quantized DCT data to an inverse-quantization circuit 101 and reads out pixel data of the secondary detection block from a reference reproduction image memory 104 by use of the motion vector information. The inverse-quantization circuit 101 subjects the quantized DCT data to the inverse quantization by effecting multiplication of the data according to the quantizer step size used for the coding operation. An inverse DCT circuit 102 subjects data for each block output from the inverse-quantization circuit 101 to the inverse discrete cosine transform so as to restore the difference data. A local reproduction adder 103 adds together pixel data of the secondary detection block output from the reference reproduction image memory 104 and the restored difference data output from the inverse DCT circuit 102 and outputs the result of addition. The reproduction reference image memory 104 stores reproduction pixel data output from the local reproduction adder 103 when the reproduced image plane is an image plane which is used later as the reference image plane. A block-to-line converter 105 converts reproduction pixel data output for each block from the local reproduction adder 103 into pixel data for each line and outputs the same for display on the image plane.

Next, a first example of the motion vector detection method for the coding operation by the above coding device is explained with reference to FIG. 15.

The motion vector detection method is explained on the assumption that the block sizes of the upper-layer image plane Ru and lower-layer image plane Rl of a to-be-code image plane are respectively set to four and eight pixels and the search ranges of the upper-layer image plane Su and lower-layer image plane Sl of the reference image plane are both set to ±2 pixels.

Figure 15:
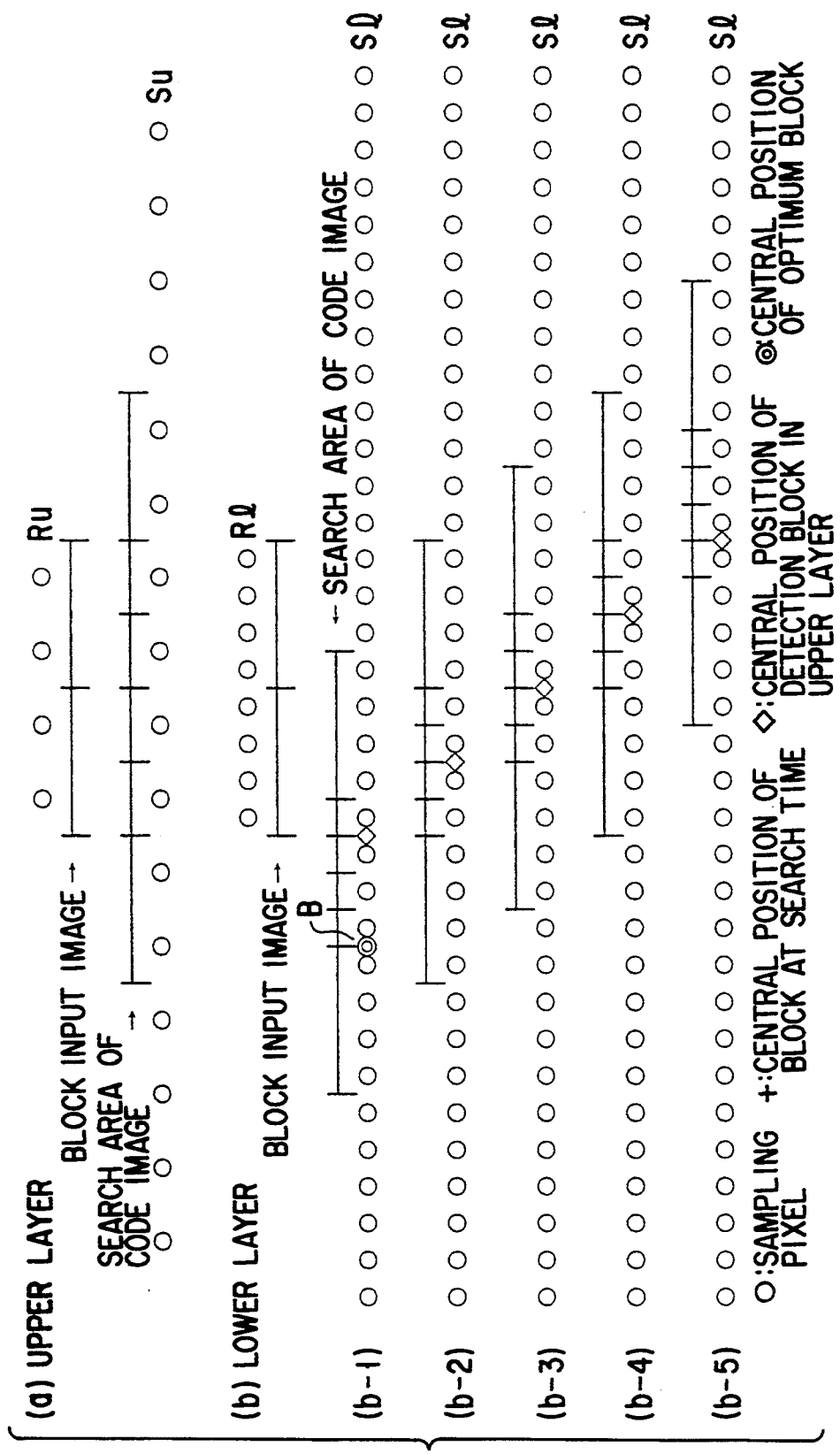
FIG. 15 is a diagram for illustrating one coding process effected by the image coding apparatus of FIG. 14.

As shown by (b-1) and (b-5) in FIG. 15, when the primary detection motion vector derived from the first motion vector detector 86 lies on the outer loop in the search range, the central position of the range searched by the second motion vector detector 89 is controlled to be further deviated from the center of the first search range so as to reduce the overlapped area of the search area of the secondary motion vector detector 89 and an area searched by the first motion vector detector 86, thus attaining an optimum prediction signal for a partial area whose movement is large. As a result, an optimum search position which cannot be detected in the conventional method can be detected by the same data processing amount as in the conventional case.

A second example of the motion vector detection method is explained with reference to FIG. 16.

The motion vector detection method is explained on the assumption that the block sizes of the upper-layer image plane Ru and lower-layer image plane Rl of a to-be-coded image plane are respectively set to four and eight pixels and the search ranges of the upper-layer image plane Su and lower-layer image plane Sl of the reference image plane are both set to ±2 pixels.

Figure 16:
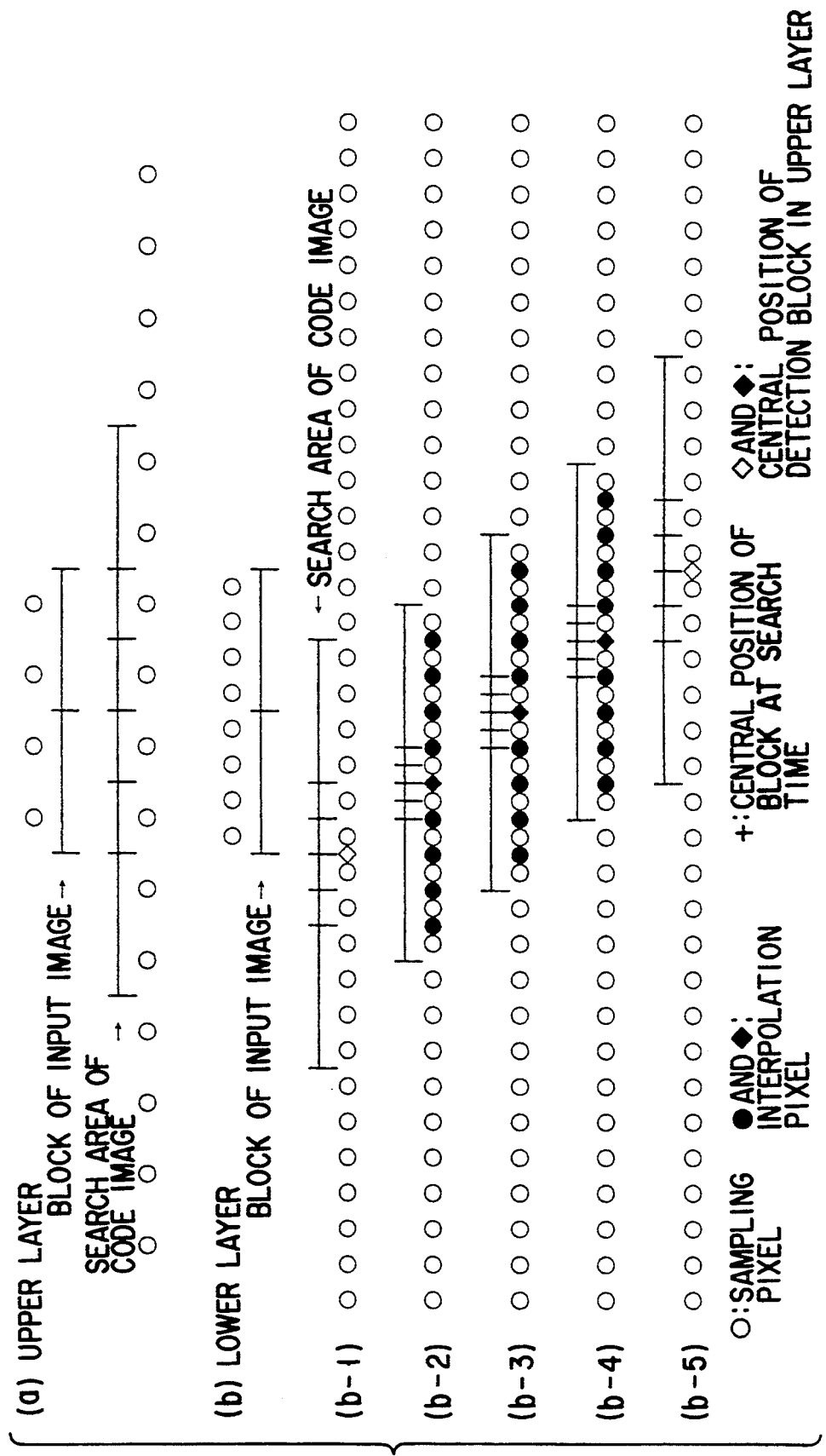
FIG. 16 is a diagram for illustrating a first motion vector detection method effected by the image coding apparatus of FIG. 14.

As shown by (b-2) to (b-4) in FIG. 16, when a motion vector derived from the first motion vector detector 86 lies on the inner loop in the search range, the pixels searched for by the second motion vector detector 89 are divided into small portions for each half of the pixel, and the search operation is effected starting from a narrow range so that an optimum prediction signal can be attained for a partial area whose movement is small. As a result, a precise search position which cannot be detected in the conventional method can be detected by the same data processing amount as in the conventional case.

Next, a third example of the motion vector detection method is explained with reference to FIG. 17.

The motion vector detection method is explained on the assumption that the block sizes of the upper-layer image plane Ru and lower-layer image plane Rl of a to-be-coded image plane are respectively set to four and eight pixels, and the search ranges of the upper-layer image plane Su and lower-layer image plane Sl of the reference image plane are both set to ±2 pixels.

Figure 17:
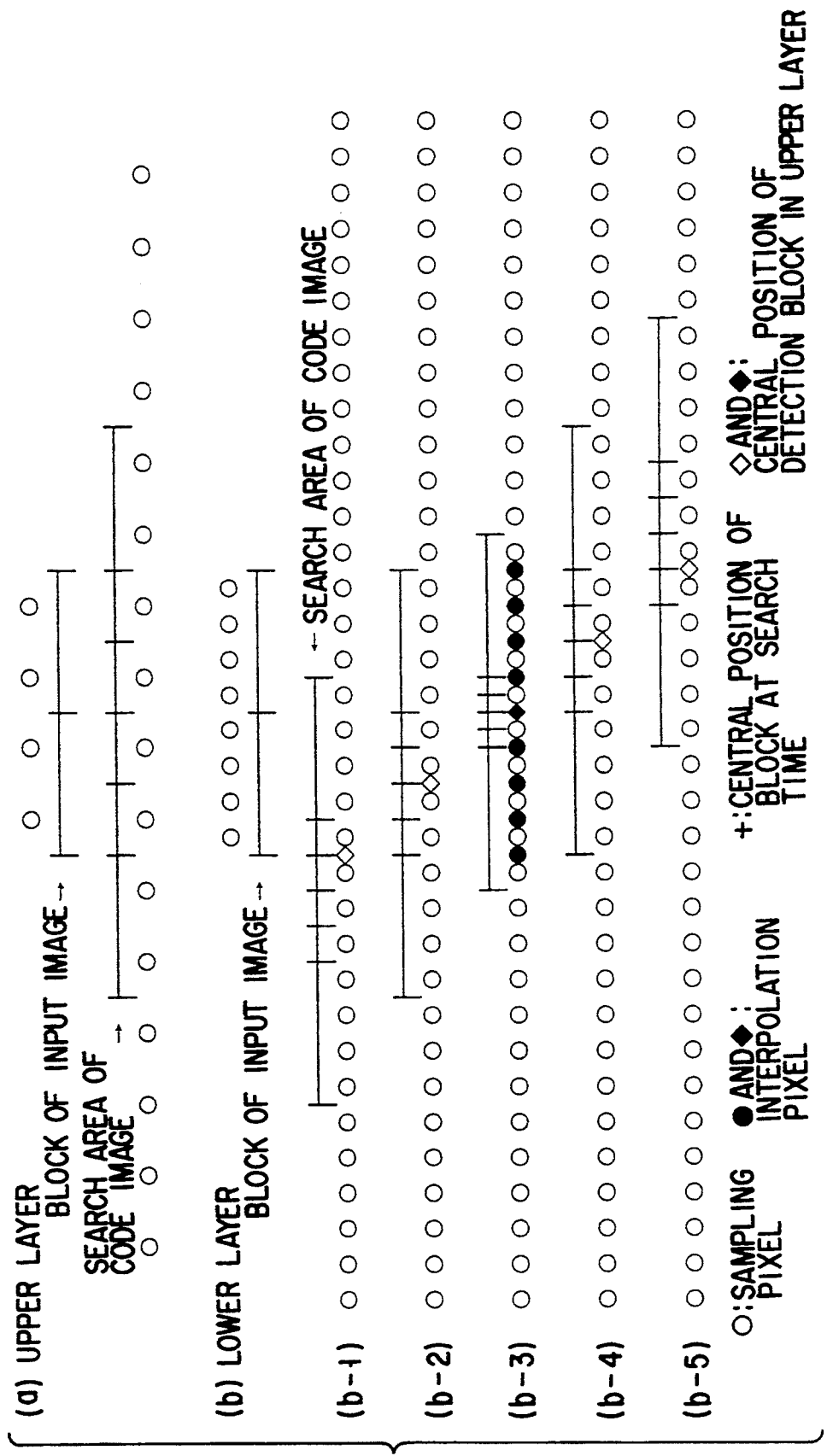
FIG. 17 is a diagram for illustrating a second motion vector detection method.

As shown by (b-1) and (b-5) in FIG. 17, when the motion vector derived from the first motion vector detector 86 lies on the outer loop in the search range, the central position of the range searched by the second motion vector detector 89 is controlled to be further deviated from the center of the first search range so as to reduce the overlapped area of the search area of the second motion vector detector 89 and an area searched by the first motion vector detector 86. Further, as shown by (b-2) and (b-4) in FIG. 17, when a motion vector derived from the first motion vector detector 86 lies on the inner loop of the search range, the central position of an area searched by the second motion vector detector 89 is controlled to be set to a position indicated by the primary detection motion vector so as to obtain an optimum prediction signal can be attained for a partial area whose movement is normal. Further, as shown by (b-3) in FIG. 17, when a motion vector derived from the first motion vector detector 86 lies on the central position of the search range, the central position of an area searched by the second motion vector detector 89 is controlled to be set to a position indicated by the primary detection motion vector so as to obtain an optimum prediction signal can be attained for a partial area whose movement is normal. As a result, a precise search position which cannot be detected in the conventional method can be detected by the same data processing amount as in the conventional case.

The pixels searched for by the second motion vector detector 89 are divided into small portions for each half of the pixel and the search operation is effected starting from a narrow range so that an optimum prediction signal can be attained for a partial area whose movement is small. As a result, a precise search position which cannot be detected in the conventional method can be detected by the same data processing amount as in the conventional case.

Figure 18:
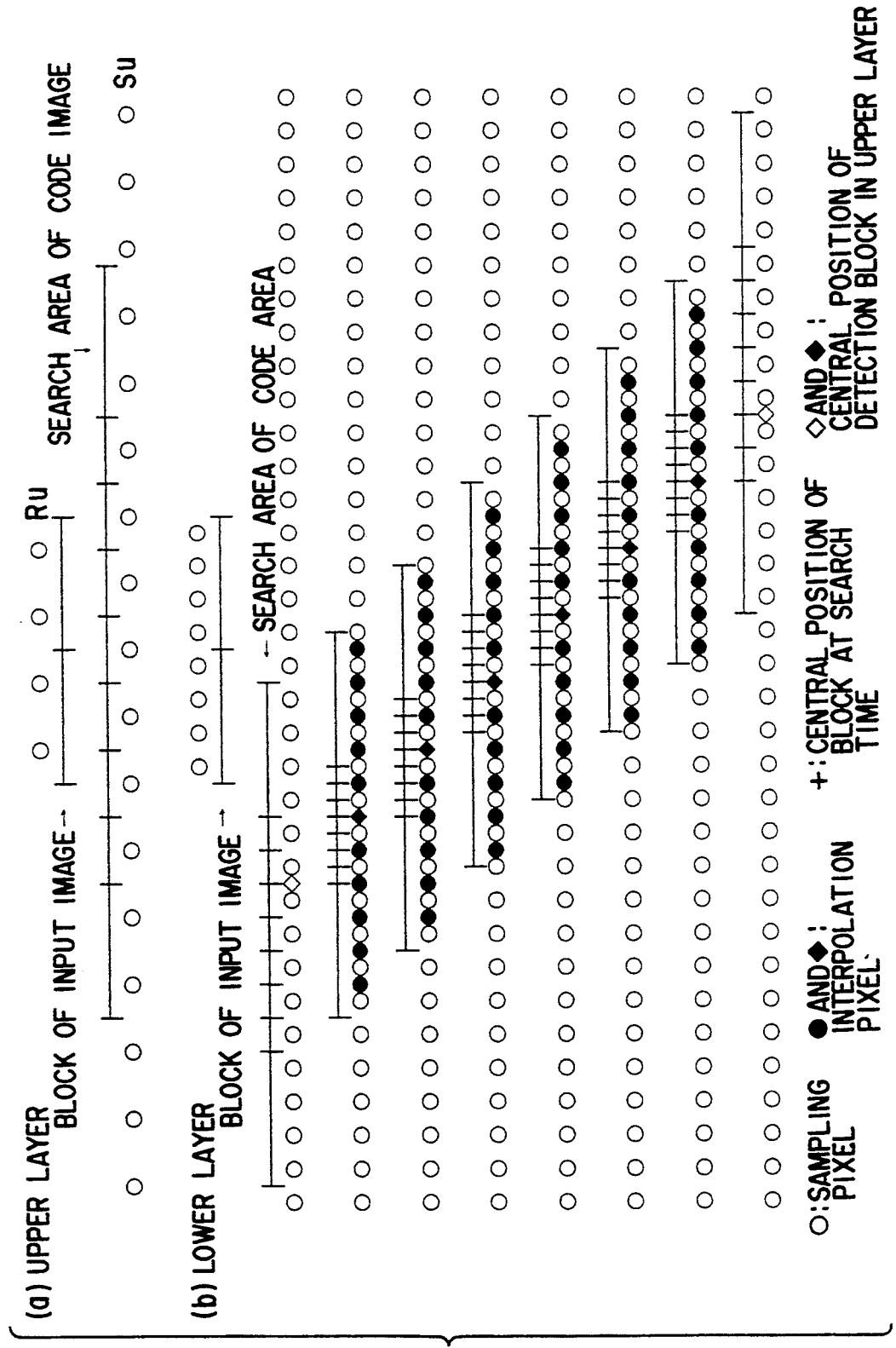
FIG. 18 is a diagram for illustrating a third motion vector detection method.

FIG. 18 shows a fourth example of the motion vector detection method.

Also, in this example, the motion vector detection method is explained on the assumption that the block sizes of the upper-layer image plane Ru and lower-layer image plane Rl of a to-be-coded image plane are respectively set to four and eight pixels and the search ranges of the upper-layer image plane Su and lower-layer image plane Sl of the reference image plane are both set to 8 pixels.

As shown in FIG. 18, the search can be made symmetrical on the right and left portions of the upper layer by setting the position of the sampling point of the upper-layer image plane on an to-be-coded image plane into the inverted phase relation with respect to the position of the sampling point of the upper-layer image plane on the reference image plane. Therefore, even when the number of search ranges is even, the search range can be made symmetrical on the right and left portions of the lower-layer image plane by using the first or third example so as to effectively utilize the processing ability.

As described above, since an adequate search range can be determined for each block, an optimum motion vector can be attained by a small amount of calculations by setting a small search range for a block which is expected to move by a small amount. Further, an optimum motion vector can be attained without lowering the coding efficiency by setting a sufficiently large search range for a block which is expected to move by a large amount.

Further, in an image area having a pattern with high resolution and less distortion by the movement, a residual error which must be encoded can be significantly reduced by deriving a motion vector at a higher precision and creating a reference image block. In contrast, in an image area having a low-resolution and flat portion, or a pattern having large distortion by the movement, the coding efficiency may not be enhanced even if a motion vector is derived at a high precision.

Therefore, it becomes possible to omit useless calculations and reduce the coding time by adequately controlling the precision at which the motion vector is derived and the search range is set for each block.

It may be possible to consider that respective patterns of images which are successive in time in a motion image move physically continuously. Therefore, when an attention is paid to a particular pattern of the image, it may be considered that a variation in the position thereof with time occurs successively. That is, it is possible to roughly predict the movement of a block in the future (or in the past) by getting information on the movement of the block in the past (or in the future) when a motion vector of the block is derived.

Based on the above fact, in this embodiment, when a motion vector for the movement from the reference image of a to-be-coded block is derived, the position indicated by an optimum motion vector used for coding a block of the reference image lying in a position corresponding to the to-be-coded block is set at the center of the search range. This is explained with reference to FIG. 19.

When a motion vector for a block 205 in a to-be-coded image 203 is derived, a vector 207 which is the same as a motion vector 206 derived for a block 204 lying in the same position in a reference image 202 which has been already coded is imaginarily set and a position 208 defined by the vector 207 is set at the center of the search.

However, in this method, the motion vector is not traced to follow the movement of an object, but the movement of an object in a block in a predetermined position is predicted. That is, an inference that an object lying in position 210 will come to a position 211 when it moves on the image plane 203 is not directly used, but instead, the movement of the object in the block 205 is predicted based on the assumption that the surroundings of the object will move in the same manner.

For this reason, if the magnitude of a normal search range is determined by the above search center setting method in a boundary portion between two areas moving in a different manner, for example, in a boundary area between the foreground and background, it becomes sometimes impossible to derive an exact motion vector.

Therefore, in this embodiment, motion vectors of the respective blocks obtained for an image immediately preceding the to-be-coded image are checked, the center of the search range given by a vector 207 in FIG. 19 is not moved for a block lying in an area having a motion vector which is significantly different from the motion vectors of the surrounding blocks, and an area larger than the search range for a normal block is set as the search range.

Further, an attention is paid to the behaviors of a motion vector candidate and an index indicating the magnitude of a prediction error for the motion vector candidate so as to effectively search for the motion vector.

As the index indicating the magnitude of the prediction error, the sum of squares of differences or the sum of absolute values of the differences between values of pixels in corresponding positions in a to-be-coded block and the candidate of a reference block indicated by the candidate of a motion vector is generally derived and a vector which causes the above result to be minimum is determined as an optimum motion vector.

When the behaviors of the candidate of the motion vector and the index therefor are checked, typical relations as shown in FIGS. 20A, 20B, 20C and 20D are often obtained. In FIGS. 20A, 20B, 20C and 20D, the abscissa indicates the candidates of the motion vectors lying on a straight line extending in a certain direction and arranged in an order of the spatial positions and the ordinate indicates the index. FIG. 20A shows a case of an image in which a relatively complicated pattern linearly moves without causing much distortion by the movement and indicates that a prediction residual error can be reduced by predicting an adequate motion vector. FIG. 20B shows a case of a flat pattern and indicates that the pattern corresponds to an area in which the coding efficiency will not significantly lowered even if precise motion compensation is not effected. FIG. 20C shows a case wherein distortion by the movement is large and a significant effect by the motion compensation cannot be obtained. FIG. 20D shows a case similar to that of FIG. 20A, but an adequate motion vector cannot be obtained in the range indicated on the abscissa.

As shown in FIG. 21, the order of motion vector candidates is so set that the motion vector candidates may be set on the center 211 and loops starting from the center 211 of the search range towards the larger loop and set at a larger interval on the larger loop. Index values are calculated for the respective candidate points, and when calculations for a preset number of candidate points are completed, whether the index values for the candidate points lying on straight lines extending in a vertical, horizontal or oblique direction shown in FIG. 21 have one of the tendencies shown in FIGS. 20A to 20D is checked for each direction.

As the above checking result, if it is detected that the index value has the tendency shown in FIG. 20A in a certain direction, it is determined that the value of an optimum motion vector in the direction is contained in the already searched range, and the calculation for deriving the index values of candidates lying in a larger area is interrupted and the calculation is effected with a higher search precision for an area near the position of a candidate having the smallest value among the index values which have been already calculated. Further, if the index value has a tendency shown in FIGS. 20B or 20C, it is determined that the coding efficiency cannot be enhanced even if the motion vector is estimated with high precision, and therefore, the interval between the candidate points is increased or the calculation for index values is interrupted. If the index value has a tendency shown in FIG. 20D, the calculation for index values having an increasing tendency is interrupted. By effecting the above processes, the useless calculations for index values can be reduced and time required for the whole coding process can be reduced.

The same tendencies are checked after all the calculations for candidates lying in a preset search range are completed, and if the tendency as shown in FIG. 20D is still detected, the search range is further extended in such a direction that the index values may be decreased as shown in FIG. 22 and then the same process is effected. With the above operation, reduction in the coding efficiency caused by insufficient size of the search range can be prevented.

The tendencies obtained from sets of the positions of candidates and the index values of the candidates are classified into categories shown in FIGS. 20A to 20D, stored into a memory by one image plane for each block, and used for setting the search precision and the initial value of the center of the search range when a motion vector of an image is successively processed.

The amount of calculations required for initially setting and resetting parameters used for search as described above is relatively small in comparison with the amount of calculations for index values for vector candidates, and as a result, the processing time can be significantly reduced.

A motion image coding device based on the above-described motion vector detection is explained with reference to FIG. 23.

Input image data S13 is divided into blocks of $8 \times 8$ pixels which are each coded as one unit by a blocking circuit 231 so as to be processed for each block. An image signal S11 of a thus extracted block is input to an encoder 232 together with an image signal S1 of a reference block which is motion-compensated by a motion compensation circuit to be described later, and a prediction residual signal which is a difference between the corresponding pixel values of the to-be-coded block and the reference block is coded. As the typical process for coding, the prediction residual signal is subjected to the two-dimensional cosine transform, each transform coefficient is subjected to the quantization, and a set of a zero-run and the value of a transform coefficient succeeding the zero-run is subjected to the low bit rate coding process using a Huffman code or the like. A coded image signal S15 is multiplexed together with a motion vector S2 used for creating the reference block by a multiplexer 237 and output as a multiplex signal S14.

Further, the coded image signal S15 is decoded into an image signal by a local decoder 236 which effects the inverse operation of the operation effected by the encoder 232 and is stored into an image buffer 235 so as to be used as a reference image at the time of coding a next image.

In a motion vector search circuit 234, index values are calculated in a predetermined order for a plurality of vector candidates according to information of the accuracy of search, the center of search for motion vector and search range initially set by a search parameter setting circuit 233. In the process of calculating the index values for the plurality of candidates, data such as a set of the position of the candidate and the index value therefor is returned to the search parameter setting circuit 233, and the search range and the accuracy of search are reset. In the motion vector search circuit 234, a vector candidate having the smallest index value in the final stage is derived, and a reference block image signal S1 in a position deviated by an amount indicated by a vector S2 of the derived vector candidate from the to-be-coded block is output together with the vector S2.

FIG. 24 is a block diagram showing the motion vector search circuit 234 and search parameter setting circuit 233.

First, the motion vector search circuit 234 is explained in detail.

In order to derive an optimum motion-compensated reference block for the to-be-coded image signal S11 which has been divided into blocks, a reference candidate block extracting circuit 242 extracts a reference candidate block S15 from reference image data S12 input from the image buffer 235 according to a motion vector candidate S10 sequentially output from a vector candidate generator 241.

The reference candidate block S15 and to-be-coded block S11 are input to the index calculator 243, the absolute values of differences between pixels lying in corresponding positions in the two blocks are calculated, and the total sum of the absolute values for all of the pixels in the block is supplied to an optimum vector detector 244 as an index value S6 for a given vector candidate S10.

Since rough search is effected in the initial stage, an optimum vector is selected from the motion vectors and then fine search is effected for small areas surrounding the area to determine a final vector. The optimum vector detector 244 is sequentially supplied with a motion vector candidate S10 and an index value S6 therefor, and when an index value smaller than the index value which has been already input is input, it holds the input index value as an optimum vector candidate, and it outputs an optimum motion vector S2 and a reference block S1 corresponding to the optimum motion vector when the whole calculation for the index values for the candidates of all of the motion vectors is completed.

In the block diagram, the reference block S1 is output from the motion compensation circuit and a difference signal between the reference block S1 and a to-be-coded block is created again in the encoder 232, but it is also possible to output a difference signal created in the index calculator 243 from the optimum vector detector 244 to the encoder 232.

Next, the search range setting circuit is explained in detail.

As a first step of determining a motion vector for a to-be-coded block, the initial values of the search center, search range and search precision are set by use of an initial search parameter setting circuit 246.

In order to determine the initial values, a motion vector for the blocks of an image which is coded immediately before determination of the initial values and a determination mode which will be described later are used. They are stored in a vector memory 247 and a determination mode memory 248, respectively.

Generally, as the search center, a value indicated by a vector stored in the vector memory 247 and derived for a block lying in the same position as an object block of the image which is coded immediately before determination of the initial values is used as it is, but if the sum of differences between a vector stored in the vector memory 247 and derived for a block to be calculated and vectors for eight blocks surrounding the block is larger than a preset value, it is determined that the area is a boundary area between two objects moving in a different manner or it is a portion which sharply moves, and the search center is not shifted according to the above vector as an exceptional case.

In FIG. 21, the search range 212 in the initial value setting step is normally set to a predetermined range, but in the above exceptional case explained in the process of determining the search center, it is set to be larger than a normal range. Further, when the determination mode data S5 indicates the tendency as shown in FIG. 20C, it is determined that the area moves sharply and the search range is set to be larger than a normal range.

As shown in FIG. 21, the accuracy of search in determination of the initial values is so set that the candidate points of motion vectors are arranged at a short interval in an area near the search center and at a longer interval in an area at a longer distance from the search center. However, in a case where the determination mode is set to a mode shown in FIG. 20B or 20C, the initial value of the search accuracy is set to be smaller than in a mode shown in FIG. 20A.

Next, the process of re-setting the search range is explained.

In this embodiment, candidates of motion vectors are sequentially derived from candidate points arranged near the search center according to the process of determining the initial values of the search parameters explained above, index values for the candidates are calculated, and then index values for candidate points arranged far from the search center are sequentially calculated. In a case where the search range is re-set, the initial values of the search parameters are checked, and if necessary, the search parameters are re-set when index values for a preset number of candidates, that is, index values for candidates arranged within a certain range from the search center are calculated before all of the index values for the candidates in the area determined in the initial value setting process in the search range are calculated.

Candidate points lying on four straight lines extending in the vertical direction 222, horizontal direction 224 and oblique directions 223 and 225 and evaluated values therefor are extracted from sets of the candidate points obtained at this stage and the evaluated values for the candidate points, then the candidate points are sequentially arranged on the abscissa according to the positional order thereof and the index values for the respective candidate points are plotted on the ordinate to make a graph, and the tendency of the graph is checked. Actually, the mean value and dispersion thereof are derived, and after the smoothing process, the evaluated values for the four points are checked and the inclination of the graph is determined. According to the result, the graph is classified into one of five categories corresponding to cases shown in FIGS. 20A to 20D and the other case.

After this, in the case of FIG. 20A, it is determined that an optimum motion vector is contained in an already searched range in a certain direction, then calculations for index values for candidates lying in an area outside the searched range is interrupted and calculations are continuously effected with higher search precision for index values for candidates lying near the candidate giving the smallest one of the index values which have been already calculated. Further, in the case of FIG. 20B or 20C, it is determined that significant improvement of the coding efficiency cannot be expected even if the motion vectors are estimated with high precision, and therefore, the interval of the candidate points is increased or the calculation for index values is interrupted. In the case of FIG. 20D, the calculation for index values having an increasing tendency is interrupted.

Further, after the calculation for all of the candidates in the search range is completed, the same classifying process is effected, and if the case of FIG. 20D is obtained, the same calculating process is effected for a search range which is extended in a direction in which the index values decrease. In FIG. 22, a case wherein the search range is extended in the oblique direction 223 and horizontal direction 224 is shown. An area 226 indicated by oblique lines indicates the search range.

The result of classification is stored into the determination mode memory 248 for each block and is used as a reference for setting the initial values of the search parameters as described before when a next image is coded.

As described above, according to this embodiment, a motion image coding device can be attained in which the coding operation can be effected by effecting the efficient motion compensation prediction with high precision and small amount of calculation, and at the same time, the coding efficiency will not be lowered even when the search range of motion vectors in an image whose movement is large is not sufficiently large.

Next, a variable length code decoding apparatus for reproducing digital information which is compressed by the above image coding device by use of a variable length code is explained.

According to the decoding apparatus, since the code length of the variable length code is known before the total code length is determined, the code length and a value of a decoding position pointer are added together. At the same time of effecting the above operation, the code length of a quasi-fixed length code is derived. Thus, the addition and the process for decoding the quasi-fixed length code are simultaneously effected so that one of the following two critical paths may be used.

| Latch | → | bit series selector | Latch | → | bit series selector |
|---|---|---|---|---|---|
|  | → | variable length code decoder |  | → | variable length code decoder |
|  | → | bit series selector |  | → | adder |
|  | → | quasi-fixed length code decoder |  |  |  |
|  | → | adder |  | → | adder |
|  | → | latch |  | → | latch |

That one of the above critical paths which corresponds to a shorter one of the processing times of (bit series selector →quasi-fixed length code decoder) and (adder) is selected.

As a result, the total processing time will be extended only by the processing time of the selected processing unit in comparison with the conventional case, and one set of the variable length code and the succeeding quasi-fixed length code can be decoded in one cycle.

In another example of the variable length code decoding process, N total code lengths which are each constructed by code lengths of N succeeding quasi-fixed codes are output from a variable length code encoder and candidates for next decoding position pointers are simultaneously calculated by use of N adders. At the same time of effecting the above operation, the code length of the quasi-fixed length code is derived and a selection signal for selecting one of the candidates is output. Thus, since N additions and coding operations for the quasi-fixed length codes are simultaneously effected, one of the following two critical paths may be used.

| Latch | → | bit series selector | Latch | → | bit series selector |
|---|---|---|---|---|---|
|  | → | variable length code decoder |  | → | variable length code decoder |
|  | → | bit series selector |  | → | adder (N parallel process) |
|  | → | quasi-fixed length code decoder |  |  |  |
|  | → | selector (result of addition) |  | → | adder (result of addition) |
|  | → | latch |  | → | latch |

That one of the above critical paths which corresponding to a shorter one of the processing times of (bit series selector →quasi-fixed length code decoder) and (adder) is selected. Assuming that (bit series selector →quasi-fixed length code decoder) is selected, the processing time of (bit series selector)+(quasi-fixed length code decoder)−(adder)−(selector) is increased in comparison with the conventional case, but one set of the variable length code and the succeeding quasi-fixed length code can be decoded in one cycle.

On the other hand, if (adder) is selected, the processing time of (selector) is increased in comparison with the conventional case, but one set of the variable length code and the succeeding quasi-fixed length code can be decoded in one cycle. In a third example of the decoding process, when the code length of a variable length code is output, candidates for next decoding position pointers are simultaneously calculated by use of N adders which add together the code lengths of N quasi-fixed length codes as offsets. At the same time of effecting the above operation, the code length of the quasi-fixed length code is derived and a selection signal for selecting the candidate is output. Thus, since N additions and coding operations for the quasi-fixed length codes are simultaneously effected, one of the following two critical paths may be used.

| Latch | → | bit series selector | Latch | → | bit series selector |
|---|---|---|---|---|---|
|  | → | variable length code decoder |  | → | variable length code decoder |
|  | → | bit series selector |  | → | adder with offset (N parallel process) |
|  | → | quasi-fixed length code decoder |  |  |  |
|  | → | selector (result of addition) |  | → | selector (result of addition) |
|  | → | latch |  | → | latch |

That one of the above critical paths which corresponds to a shorter one of the processing times of (bit series selector →quasi-fixed length code decoder) and (adder with offset) is selected.

Assuming that (bit series selector →quasi-fixed length code decoder) is selected, the processing time of (bit series selector)+(quasi-fixed length code decoder)−(adder)+(selector) is increased in comparison with the conventional case, but one set of the variable length code and the succeeding quasi-fixed length code can be decoded in one cycle.

On the other hand, if (adder with offset) is selected, the processing time of (adder with offset)−(adder)+(selector) is increased in comparison with the conventional case 1, but one set of the variable length code and the succeeding quasi-fixed length code can be decoded in one cycle.

The decoding apparatus is explained more in detail with reference to the drawings.

First, a first example of the variable length code decoding apparatus shown in FIG. 25 is explained. In this case, assume that variable length code bit series "0110011 10101110 - - - " is decoded by use of a variable length code table shown in FIG. 26. The variable length code bit series input to an input terminal 301 is divided for every 3 bits, for example, and stored into a temporary memory 302 (in this example, the maximum code length of the variable length code is 3). Information (decoding position pointer) indicating an extent to which the variable length code bit series is decoded is stored in a latch 303, but as shown in FIG. 27, the content of the latch 303 is initialized to "0" in the initial state. A bit series selector 304 selects and outputs bit series "0110011" of M bits (M is set to be equal to or larger than the maximum bit length of the code lengths of sets of the variable length codes and succeeding quasi-fixed length codes and is set to 7, for example) for decoding the next variable length code by use of the above latch information. The output bit series "0110011" is input to a variable length code decoder 305 which in turn outputs a decoding result S33 ("a") and the code length S34 ("1") of the variable length code. The code length S34 of the variable length code and the content of the latch 303 are added together by means of an adder 308 and the interim result S32 ("1") is output therefrom. At the same time of adding process, an output of the bit series selector 304 and the code length S34 of the variable length code are input to a bit series selector 311 to remove a portion of the variable length code from the bit series. The remaining bit series and the decoding result S33 are input to a quasi-fixed length code decoder 312 which in turn outputs a decoded value S36 ("a") and the code length S37 of the quasi-fixed length code.

The interim result S31 ("1") obtained by addition in the adder 308 and the code length S37 ("0") of the quasi-fixed length code are added together by means of an adder 315 and thus the addition result 32 ("1") can be derived. The addition result is input to the latch 303 and temporary memory 302. When a next clock S38 is input, the latch 303 latches a remainder obtained by dividing the addition result S32 by M, for example, 7. Further, the addition result S32 is stored in the temporary memory 302, and the value of the pointer is kept unchanged when the quotient obtained by dividing the addition result S32 by M is "0" and the value of the pointer is incremented when the quotient is "1".

Likewise, a new decoding position pointer is used to decode a next variable length code.

FIG. 28 shows a second example of the variable length code decoding apparatus. Also, in the second example, the variable length code table shown in FIG. 26 is used. A variable length code bit series "011011 - - - " input to an input terminal 401 is stored in a temporary memory 402. Information (decoding position pointer) indicating an extent to which the variable length code bit series is decoded is stored in a latch 403. However, as shown in FIG. 29, the decoding position pointer information is initialized to "0" in the initial state. A bit series selector 404 selects and outputs bit series "0110011" of M bits (M is set to be equal to or larger than the maximum bit length of the code lengths of sets of the variable length codes and succeeding quasi-fixed length codes and is set to 7, for example) for decoding the next variable length code by use of the above latch information. The output bit series is input to a variable length code decoder 405 which in turn outputs a decoding result S41 ("a"), the code length S42 of the variable length code and the total code lengths S43a to S43n of sets of N variable length codes and succeeding quasi-fixed length codes. The content "0" of the latch 403 and the total code lengths S43a to S43n of sets of N variable length codes and succeeding quasi-fixed length codes are added together by means of N adders 408a to 408n. At the same time of effecting the adding process, an output of the bit series selector 404 and the code length 407 of the variable length code are input to a bit series selector 411 to remove a portion of the variable length code from the bit series. The remaining bit series and the decoding result S41 are input to a quasi-fixed length code decoder 412 which in turn outputs a decoded value S44 and a selection signal S45 of the total code length.

A decoding position pointer selector 415 selects the result of addition effected by use of the correct total code length among the addition results obtained by the adders 408a to 408n by use of the selection signal S45. The selected addition result S46 is input to the latch 403 and temporary memory 402. When a next clock 407 is input, the latch 403 latches a remainder "1" obtained by dividing the selected addition result S46 by M. The addition result S46 is also input to the temporary memory 402, and when the quotient obtained by dividing the addition result S46 by M is "0", the value of the pointer is kept unchanged, and when the quotient is "1", the value of the pointer is incremented.

Likewise, a new decoding position pointer is used to decode a next variable length code.

FIG. 30 shows a third example of the variable length code decoding apparatus. Also, in the third example, the variable length code table shown in FIG. 26 is used. According to this decoding apparatus, a variable length code bit series "011011 - - - " input to an input terminal 501 is stored in a temporary memory 502. Information (decoding position pointer) indicating an extent to which the variable length code bit series is decoded is stored in a latch 503. However, as shown in FIG. 31, the decoding position pointer information is initialized to "0" in the initial state. A bit series selector 504 selects and outputs a bit series "0110011" of M bits (M is set to be equal to or larger than the maximum bit length of the code lengths of sets of the variable length codes and succeeding quasi-fixed length codes and is set to 7, for example) for decoding the next variable length code by use of the above latch information. The output bit series is input to a variable length code decoder 505 which in turn outputs a decoding result S51 ("a") and the code length 507 of the variable length code. The content "0" of the latch 503 and the code length 507 of the variable length code are added together by use of one adder 508 and N adders with offset 508a to 508n. At the same time of effecting the adding process, an output of the bit series selector 504 and the code length S42 of the variable length code are input to a bit series selector 511 to remove a portion of the variable length code from the bit series. The remaining bit series and the decoding result S51 ("a") are input to a quasi-fixed length code decoder 512 which in turn outputs a decoded value S54 ("a") and a selection signal S55 for determining whether the decoded bit series is a code constructed by only the variable length code or one of N sets of the variable length codes and the succeeding quasi-fixed length codes, that is, a signal for selecting the adder 508a.

A decoding position pointer selector 509 selects a correct total code length among the addition results obtained by the adder 508 and the adders 508a to 508n with offset by use of the selection signal S55. The selected addition result S56 is input to the latch 503 and temporary memory 502. When a next clock S58 is input, the latch 503 latches a remainder "1" obtained by dividing the selected addition result S56 by M. The addition result S56 is also input to the temporary memory 502, and when the quotient obtained by dividing the addition result S56 by M is "0", the value of the pointer is kept unchanged, and when the quotient is "1", the value of the pointer is incremented.

Likewise, a new decoding position pointer is used to decode a next variable length code.

Next, an image decoding system utilizing a variable length code decoding apparatus is explained with reference to FIG. 32. According to this system, variable length data is input to an input terminal 601. The variable length code data is not particularly limited, but in this example, like MPEG, it may include data obtained by converting image data into a coefficient (DCT coefficient) having a small correlation by a combination of the DCT (discrete cosine transform) and adaptive prediction and quantizing the coefficient, information of quantization characteristic and information of prediction method.

A variable length code decoding apparatus 610 decodes variable length code data. If the decoded data is data obtained by quantizing the DCT coefficient or information of quantization characteristic, the decoded data is output to an inverse quantization circuit 620. If the decoded data is information of prediction method, the decoded data is output to an adaptive prediction circuit 650.

In a syntax analyzing circuit 611, whether a next variable length code represents data obtained by quantizing the DCT coefficient, information of quantization characteristic or information of prediction method is determined and the type of the variable length code decoding apparatus is changed accordingly.

In the inverse quantization circuit 620, the quantized DCT coefficient is subjected to the inverse quantization by use of the input inverse quantization characteristic and the result of the process is output to an inverse DCT circuit 630.

In the inverse DCT circuit 630, the input DCT coefficient is subjected to the inverse DCT process and a difference between it and the adaptive prediction signal is restored.

In the adaptive prediction circuit 650, an adaptive prediction signal is created by use of division of the input prediction method.

An adding circuit 640 adds together difference data output from the inverse DCT circuit 630 and the adaptive prediction signal output from the adaptive prediction circuit 650 to reproduce image data. An image data portion among the reproduced image data which is referred to by the adaptive prediction circuit 650 is stored in a reference image temporary memory 660 and output to a scan converting circuit 670 when a next reference image is input. Further, an image data portion which is not referred to by the adaptive prediction circuit 650 is immediately output to the scan converting circuit 670.

The scan converting circuit 670 functions to change the order of the output pixels, switches a parallel signal of the luminance signal and color signal for each scanning line in image data reproduced and output for each two-dimensional block from the adding circuit 640 and a parallel signal of the luminance signal and color signal for each scanning line output from the reference image temporary memory 660 according to the original order and outputs the signal to an image display unit such as a TV monitor.

The variable length code decoding apparatus can be used not only in the image decoding system shown in FIG. 32, but also it can be used in a case where all the digital information compressed by use of a code system including a set of a variable length and a succeeding quasi-fixed length code is restored.

According to the above variable length code decoding apparatus, a set of a variable length and a succeeding quasi-fixed length code can be decoded in one cycle, and at the same time, the processing time for decoding can be set substantially equal to the processing time required for decoding only the variable length code.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of detecting a motion vector, comprising:
   a first step for blocking an input image signal to be coded into a plurality of input blocks each consisting of a plurality of pixels;
   a second step for sub-sampling the input image signal at a predetermined pixel interval, to obtain a sub-sampled image signal;
   a third step for obtaining a sub-sampled input block from the sub-sampled image signal;
   a fourth step for searching in a predetermined range the sub-sampled image signal which has already been subjected to a coding process for a primary block most correlated with the sub-sampled input block, to output a primary motion vector which indicates the primary block most correlated with the sub-sampled input block; and
   a fifth step for controlling at least one of a central position of a searching area and a searching pel accuracy in accordance with a type of the primary motion vector, to search for a secondary block most correlated with one of the input blocks, to output a secondary motion vector.

2. A method according to claim 1, wherein the fifth step includes a step of controlling the central position so as to locate it on a position indicated by the primary motion vector when the primary motion vector is on a central position of a primary motion vector searching range.

3. A method according to claim 1, wherein the fifth step includes a step of controlling a central position of a secondary motion vector searching range so as to separate it from a position which is indicated by the primary motion vector so that an overlapping portion of the secondary motion vector searching range with a primary motion vector searching range is decreased when the primary motion vector is on a peripheral portion of the primary motion vector searching range.

4. A method according to claim 1, wherein the fifth step includes a step of setting a searching pel accuracy at a half pixel or finer, for searching the secondary motion vector from among a narrow area whose central position is indicated by the primary motion vector when the primary motion vector is on a central position of primary motion vector searching range.

5. A method according to claim 1, wherein the second step includes a step of sub-sampling a coded image signal with a phase that differs from a sub-sampling phase of the input image block.

* * * * *